Nov. 10, 1959
B. A. SWANSON
2,911,951
METHODS OF INCREASING THE WORK EFFICIENCY OF A TOOL BY
GENERATION OF A SYMPATHETIC VIBRATION CONDITION IN
THE MASS BEING WORKED, AND HIGH SPEED ENGINES
FOR EMPLOYING SAID METHODS
Filed Dec. 2, 1955
4 Sheets-Sheet 1
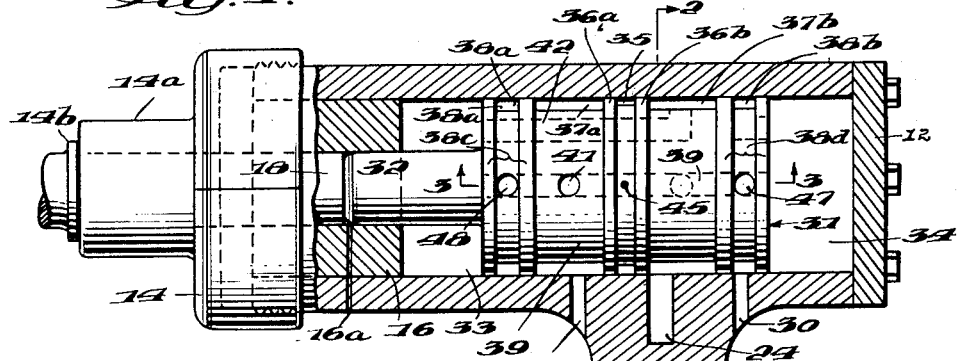
INVENTOR
BERNARD A. SWANSON,
BY *Albright Arnold*
ATTORNEY

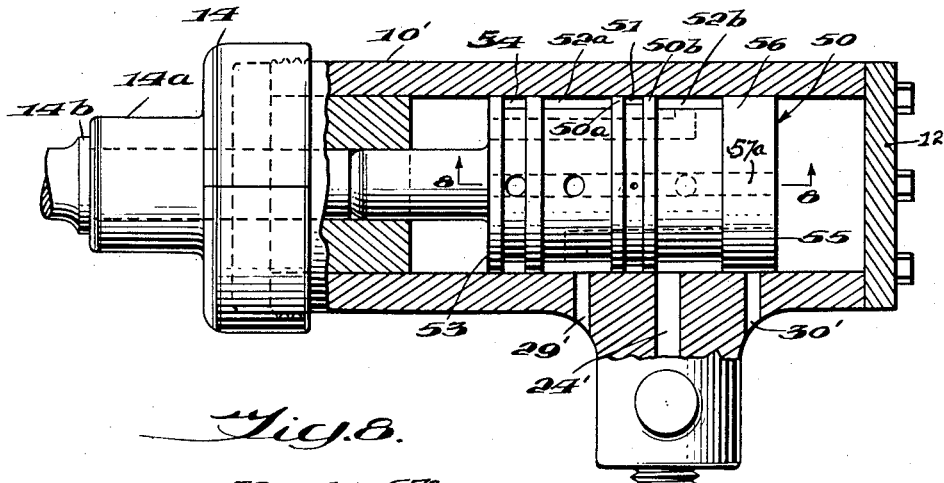
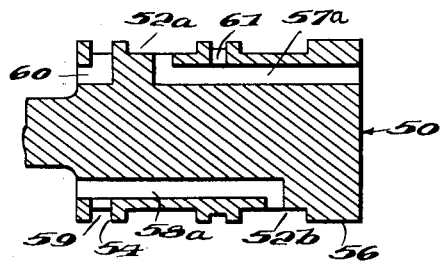
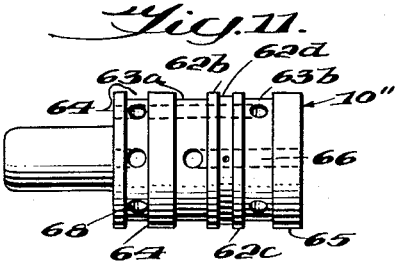
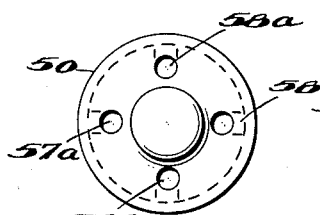
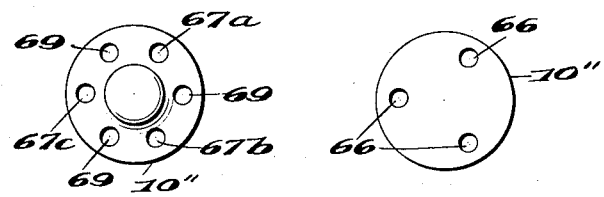
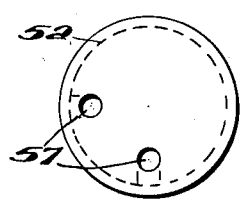
INVENTOR
BERNARD A. SWANSON,
BY
ATTORNEY Nov. 10, 1959　　　　B. A. SWANSON　　　　2,911,951
METHODS OF INCREASING THE WORK EFFICIENCY OF A TOOL BY
GENERATION OF A SYMPATHETIC VIBRATION CONDITION IN
THE MASS BEING WORKED, AND HIGH SPEED ENGINES
FOR EMPLOYING SAID METHODS
Filed Dec. 2, 1955　　　　　　　　　　　　4 Sheets-Sheet 3
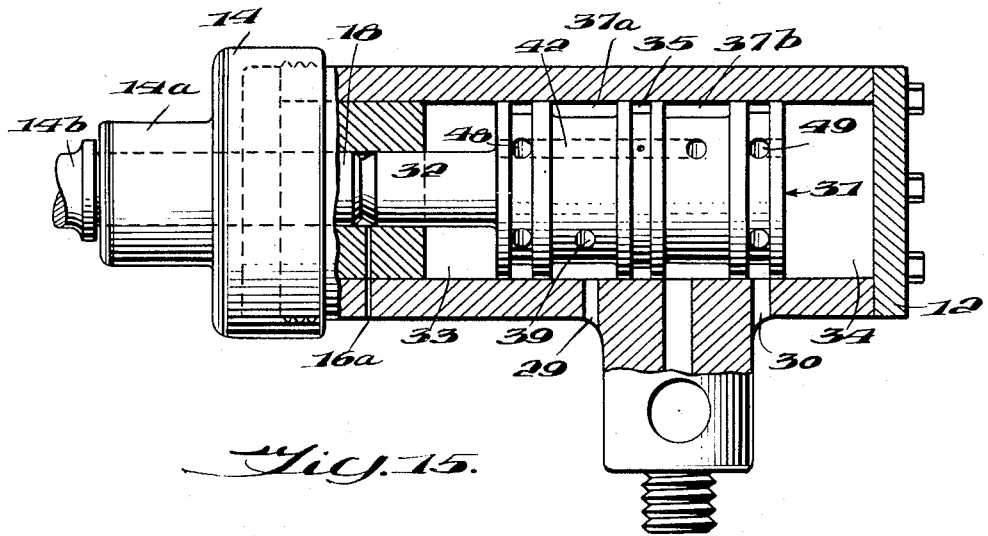
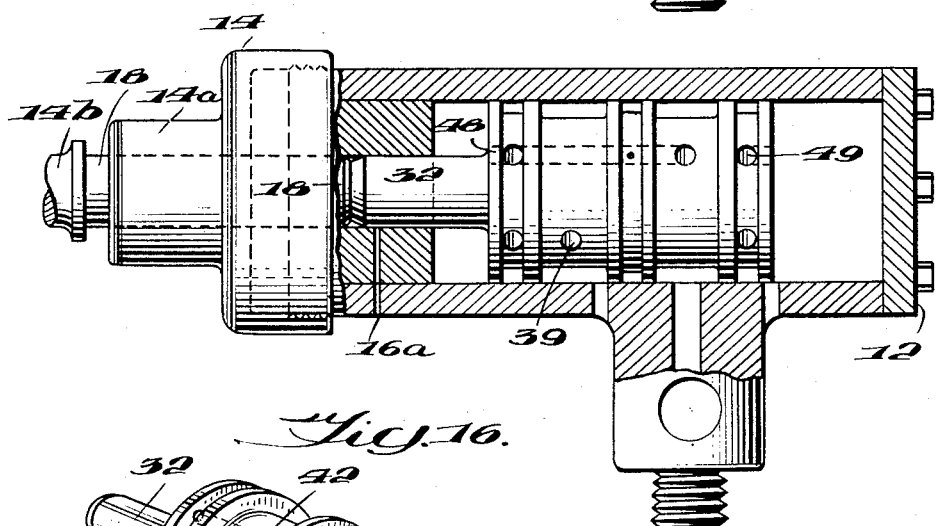
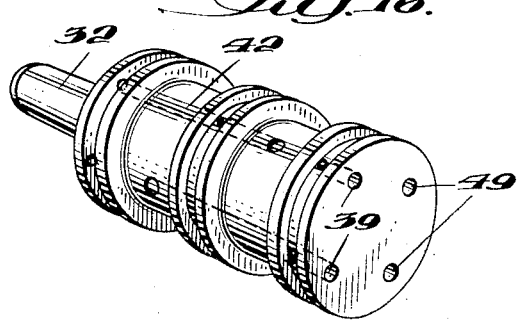
INVENTOR
BERNARD A. SWANSON,
BY *G. Wright Arnold*
ATTORNEY

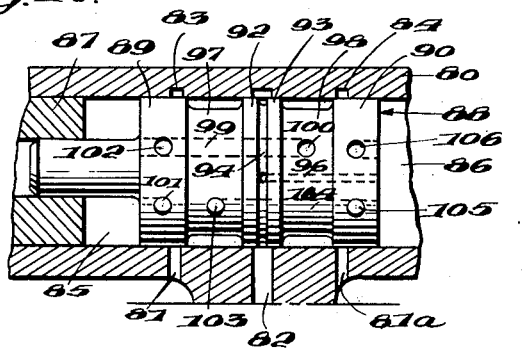

United States Patent Office 2,911,951
Patented Nov. 10, 1959

2,911,951

METHODS OF INCREASING THE WORK EFFICIENCY OF A TOOL BY GENERATION OF A SYMPATHETIC VIBRATION CONDITION IN THE MASS BEING WORKED, AND HIGH SPEED ENGINES FOR EMPLOYING SAID METHODS

Bernard A. Swanson, Sacramento, Calif.

Application December 2, 1955, Serial No. 550,553

30 Claims. (Cl. 121—17)

The present discovery and invention relates to the novel art or method of creating in a solid mass a condition, which condition renders the said mass receptive to the application of a work performing element operated by a fluid pressure medium and further relates to compressed fluid operated mechanism for carrying out the same.

More particularly my discovery and invention relates to providing a new art or method for creating a condition in a solid mass to be worked upon, which condition renders the mass receptive to the application of the work performing element, which element is operated by a fluid pressure operated piston at exceedingly high speeds of reciprocation in creating said condition through the instrumentality of said work performing element, which piston is adjustably applied to the said element, and also the invention pertains to the mechanism for carrying out said novel process or art.

Furthermore, a fundamental object of my invention is to provide said art or method which has the highly advantageous industrial efficiency of performing a given operation in a period of time much less than that required at present by mechanism commonly employed for performing like operations upon solid masses and which mechanism is of a plurality of times less in weight.

Particularly is it the object of my discovery and invention to create the said condition in said mass by subjecting the same to a series of blows of very high speed, which blows are created by a fluid pressure operated piston operating in a cylinder, the piston having two end faces each of which is remote from the longitudinal center of the piston against which faces the pressure fluid medium operates and each of said faces in reciprocating being projected into the end chambers of said cylinder remote from the longitudinal center of said cylinder, said piston being characterized by having an adjustable speed and length of stroke controlled by the operator, which speed and stroke are of the required frequency and length to make the mass respond in its disturbance at a rate which corresponds to the special property characterizing the particular material of said mass.

A fundamental and primary object of my discovery and invention is the providing of extremely quick exhausting and removal of the fluid pressure medium after use. The key to accomplish this is the providing of short passageways leading from the end face of the piston to the adjacent portion of the cylindrical face. After getting the fluid pressure medium from the end face of the piston, the provision of a transverse chamber or channel either in the piston or in the cylinder bore face to function in cooperation with said short passageway greatly facilitates and hastens the reduction of the dropping of the pressure—the said chamber or channel being connected to the atmosphere.

A like fundamental and primary object of my discovery and invention is that relating to the providing of proportionate fast admission of inlet fluid pressure medium by providing increased space or distance between the wide pressure receiving channels or ports.

In short, a fundamental and primary object of my discovery and invention is the providing of a fluid pressure medium operated engine characterized by:

(a) Extremely fast admission of compressed fluid medium by having the inlet means of a width slightly less than the center lug or the distance between the inlet ports of the piston;

(b) Having the volume of the end chambers proportioned to the desired travel distance of the piston into said chambers, even in some instances having the piston hit the end, as for illustration and not limitation, in a puller mechanism;

(c) The width of the inlet wide channel or width of inlet ports of the piston is much greater than the width of the inlet means in the cylinder to get the desired range of adjustability, as appropriate for the type of engine involved.

Of the above, the novel exhausting means is an essential feature, that is, the providing for the quick exhausting moving channels or chambers in one end or both ends of the piston, or channels or chambers in the cylinder bore face, and the short passages leading from the end face of the piston to the adjacent portion of the cylindrical face portion of the piston, and the ports leading from said cylindrical face portion of the piston to a longitudinally directed passage in the piston.

Furthermore, it is a fundamental and primary object of my discovery and invention to have the speed and stroke of the above described piston adjustable to engage the tool performing element at such point of its reciprocation as will cause said piston to deliver its maximum or desired adjusted magnitude of impact force and at the rate required to create the necessary condition of disturbance to provide the optimum or desired degree of such condition as will render such mass most receptive to the application of said work performing element for the desired degree of efficiency.

Again furthermore, it is a fundamental and primary object of my invention to adapt or adjust the use of the mechanism to perform the process or art of my invention by adjusting the closeness of the engine to the shank end of the work performing element until the required length of stroke, adjusted power and adjusted speed and type of vibration is attained in the mass at which the work performing element performs freely, readily and easily its efficient operation.

It is a further fundamental and primary object of my invention to selectively and operationally adjust the reciprocation frequency of a compressed fluid operated reciprocating engine by controlled regulation of the fluid input rate and pressure, so that the speed and length of stroke of the engine and tool driven thereby may generate and be synchronized with a characteristic vibration condition of the mass being worked at which the work performing element operates most efficiently.

Wherever the term "compressed air" is employed herein, it will be understood to be the equivalent of the term "fluid pressure medium" which includes steam and gases, and likewise wherever the term "fluid pressure medium" is used, it will be understood to include "compressed air."

A primary object of the present discovery and invention is to provide an improved compressed fluid operated engine which is designed in a novel manner whereby it may be made of small size and light weight and at the same time perform operations far more speedily, efficiently and with less volume of fluid pressure medium, which operations are at the present time performed by fluid pressure reciprocating tools of a materially greater weight and size.

Another primary object of my discovery and invention is to provide an improved fluid pressure operated engine employing a reciprocating piston wherein the piston design is of novel character as a result of which exceptionally high speed reciprocation of the piston is effected with the employment of less volume of fluid pressure medium and having a pressure not greater than the pressure at present employed in the operation of larger and heavier types of fluid pressure operated engines of common design.

A still further primary object of the discovery and invention is to provide in a fluid pressure operated engine employing a reciprocating piston, novel improvements in the air admission and exhaust ports which provide for the high speed introduction of the operating air and its high speed discharge from the piston cylinder whereby reversal of movement of the piston in the cylinder is accomplished with extreme rapidity.

Still another object of the discovery and invention is to provide an improved fluid pressure operated engine of the character above set forth wherein the construction is such that the reciprocating piston can be operated at speeds greatly in excess of the speeds employed in the operation of compressed fluid engines or pneumatic tools of the character at present in use and with an extremely short stroke whereby the driving or hammering force of the piston is repeated with great rapidity as a result of which the tool to which such force is applied, where such tool may be a cutting tool, is forced through the hardest material in a manner suggesting the application thereto of a steady pushing force rather than a force resulting from a series of blows, the length of stroke, speed, power and type of vibration being adjustable by the operator.

A further and more specific primary object of my discovery and invention is to provide a compressed fluid operated engine for accomplishing the above described objects which is of extremely simple construction and therefore may be inexpensively manufactured.

A further primary object of my invention and discovery in providing the novel process disclosed herein relates to adjusting the length of strokes of the piston operated by fluid pressure, said adjusting being controlled by varying the closeness of approach with which the engine is held to the tool shank end of the work performing element while the latter is contacting the mass to be worked. Said adjusting of the length of the stroke, speed and force of the blow of the piston of my discovery and invention is controlled by said closeness, which in turn is controlled by the operator.

Yet another primary object of my invention and discovery in providing the novel methods of reciprocatory tool operation disclosed herein relates to adjusting the speed and length of stroke of a piston operated by fluid pressure, such selective adjustment being controlled by selective variation of the fluid medium input rate and pressure, which mode of practice of the invention may be utilized in conjunction with an adjustment of the speed and stroke by varying the closeness of approach of the engine piston to the tool shank, or may be utilized in a tool wherein the tool shank is connected directly to the engine piston or extension thereof, it being further apparent that in either event either or both modes of adjustment are readily under operational control by manipulation of the tool during use.

The above mentioned general objects of my discovery and invention, together with others inherent in the same, are attained by the process and mechanism illustrated in the following drawings, throughout which like reference numerals indicate like parts:

Figure 1 is a view partly in longitudinal section and partly in elevation of a compressed fluid operated engine constructed in accordance with one embodiment of the present discovery and invention;

Fig. 2 is a sectional view taken substantially on the line 2—2 of Fig. 1;

Fig. 3 is a longitudinal section taken substantially on the line 3—3 of only the piston in Fig. 1;

Fig. 4 is a view in side elevation of the piston rotated approximately a quarter turn from the position in which it is illustrated in Fig. 1, the direction of rotation being toward the viewer or anti-clockwise when looking at the back end of the piston;

Fig. 5 is a view in elevation of the front end of the piston shown in Fig. 1;

Fig. 6 is a view in elevation of the back end of the piston shown in Fig. 1;

Fig. 7 is a view corresponding to that of Fig. 1 but showing a modified type of piston without any moving rear exhaust channel or chamber;

Fig. 8 is a longitudinal section through the piston shown in Fig. 7 taken substantially on the line 8—8 of said figure;

Fig. 9 is a view in front elevation of the piston as shown in Fig. 7;

Fig. 10 is a view in elevation of the back end of the piston shown in Fig. 7;

Fig. 11 is a view in side elevation of another piston design form for high speed operation;

Figs. 12 and 13 illustrate respectively the front end and rear end elevations of the piston form of Fig. 11;

Fig. 14 is a view in longitudinal section with the piston in elevation and turned to an angle to reveal the horizontal passages more definitely than in Fig. 1 and with the engine close or against the stop-shoulder of the tool shank;

Fig. 15 is a view in longitudinal section with the piston in elevation showing the engine removed from the stop-shoulder of the tool shank;

Fig. 16 is a view in perspective of the piston of Fig. 1 showing more definitely the passageways through the piston and the end exhaust short passageway;

Fig. 17 is a view in longitudinal section with the piston in elevation of a modified form of my discovery and invention;

Fig. 18 is a view in elevation of a modified form of piston of my invention;

Fig. 19 is a view in longitudinal section with the piston in elevation of still another modified form of my invention;

Fig. 20 is a view in longitudinal section of yet another form of reciprocatory engine driven tool suitable for practice of a method according to my invention and discovery, wherein the working tool is directly connected to the piston of the reciprocatory engine, and the reciprocation frequency and length of stroke thereof are selectively and operationally controlled by means of regulating the fluid medium input rate and pressure, such operational control being effected by means of one or more manually controlled fluid medium inlet valves;

Fig. 21 is a front elevation view of the form of mechanism illustrated in Fig. 20;

Fig. 22 is a partial view in transverse section taken along line 22—22 of Fig. 20, presenting in further detail the arrangement of a pre-settable fluid medium inlet valve of this modified form of mechanism for practice of my invention and discovery; and Fig. 23 is a view in longitudinal section of a further form of reciprocatory engine driven tool typically suitable for practice of a method according to my invention and discovery wherein the working tool is connected to the piston of the reciprocatory engine through a rack and pinion gear mechanism, and wherein the fluid medium input rate and pressure are controlled by a manually regulated throttle valve.

Referring now more particularly to the drawings and more specifically to the mechanism presented in Figs. 1 through 7 and the mode of operation according to my invention for which said mechanism is particularly adapted, the numeral 10 generally designates the engine cylinder which is closed at the back end by a plate 12. The front end of the cylinder is shown with a cap nut 14 which may be integrally formed thereon and which may maintain in position the front end of a tool shank bushing 16 within the cylinder into which is extended, part way through the bushing, the shank 18 of a tool, not shown, which may be in the form of a cutting chisel, drill or the like. The projection 14ª is a part of the cap nut 14. A shoulder 14ᵇ is provided on the tool shank 18.

Formed integrally with the wall of the cylinder 10 is the radially directed extension 20 terminating in the threaded nipple 22 for connecting with a source of fluid pressure, not shown.

Formed through the nipple and said extension 20 is the air or fluid pressure medium admission passage 24 which is interrupted by the ball valve seat 25 on which may be pressed the valve ball 26. The spring 27 maintains the ball on its seat to close the air passage 24 and reciprocably mounted in the extension 20 to work in opposition to the spring 27 against the ball 26, is the valve control button 28 which when manually pressed inwardly unseats the ball and opens the passage a selectively variable degree, if desired, for the flow of compressed air or fluid pressure medium therethrough.

The nipple 22 is provided for attachment to an air hose carrying air or fluid pressure medium under suitable pressure from a suitable source (not shown) for the operation of the tool of my discovery and invention.

In addition to the passage 24, the cylinder has formed in the wall thereof at opposite sides of the passage 24 the compressed air exhaust ports 29 and 30. These ports are preferably equidistantly spaced on opposite sides of the inlet passage 24 for the purpose of exhausting the compressed fluid from the cylinder and the piston.

Within the cylinder is the piston 31, the piston being of the so-called hill and valley type that is, a piston which has channels or grooves cut therein as herein set forth.

Extending axially from the forward end of the piston and forming a part thereof is the stem 32 which has its forward end directed into the bushing 16 in the manner illustrated. A small passage 16ª provides for relieving any fluid pressure between the end of the tool shank and the end of piston stem 32. When the piston is at the limit of its forward movement there is a space between the forward end of the piston and the bushing 16 which provides the forward chamber 33 and at the back end of the piston between the same and the wall 12 is the rear air chamber 34 which chambers operate to confine compressed fluid medium in cushioning and preventing the piston striking the end walls of the cylinder and said chambers operate as expansion chambers in augmenting the force of the freshly admitted fluid pressure in reversing the direction of the piston. The length of these chambers may be varied depending upon the type of power and speed and vibration desired.

Preferably at the transverse center of the piston there is formed a lug comprising the shallow and narrow starting circumferential groove 35 between lands 36ª and 36ᵇ. At each side of the groove 35 and spaced therefrom by narrow lands 36ª and 36ᵇ are relatively wide channels 37ª and 37ᵇ which by reason of their width provide the basis for longer strokes and more powerful blows by providing for a longer period for admission of fluid pressure. In providing some types of engines where adding weight to the piston is limited to one direction with respect to the inlet port in the cylinder, the central lug, or its equivalent in the smooth type of piston, may be located nearer to one than the other end of the piston.

In the embodiment of the engine as illustrated in Figure 1 the piston has formed therearound between each end and the adjacent wide channel 37ª and 37ᵇ, narrow circumferential movable exhausting end channels 38ª and 38ᵇ provided in end lugs 38ᶜ and 38ᵈ, respectively.

In the construction of the piston illustrated in Figures 1 to 6 there may be formed longitudinally in the piston body two rearwardly opening air passages 39 and 39ª which open through the back end 40 of the piston and each of which at its forward end opens through the radial port 41 into the forward channel 37ª.

Also formed through the body of the piston may be the two air passages 42 and 42ᵇ which open at their forward ends through the forward or front end 43 of the piston body while their rear ends open through the radial ports 44 into the rearmost wide channel 37ᵇ.

Opening into one of the longitudinal passages here shown as one of the passages 39, may be a radial starting orifice 45 which communicates with the narrow starting groove 35. This orifice 45 and the central groove 35 constitutes a starter passage for the piston 31 in the event that said piston 31 stops on dead center in the cylinder and it will be seen that the lands 36ª and 36ᵇ between the groove 35 and the adjacent channels 37ª and 37ᵇ are of a width slightly less than the diameter of the air admission passage 24 so that the piston 31 cannot stop either in its forward movement or in its rearward movement in a position where the air admission passage 24 will not be in communication either with one of the wide air receiving channels 37ª or 37ᵇ or with the starter groove 35. The starting orifice provides for starting in case piston stops in position closing inlet means.

When the piston is at the limit of its forward movement, the air admission passage 24 is in full communication with the rear air receiving channel 37ᵇ and when the piston is at the extreme limit of its rearward movement the air admission passage 24 will be in full communication with the forward air receiving channel 37ª. Thus, if the compressed air is admitted through the passage 24 when the piston is in the position shown in Figure 1 it will be seen that the air will enter the rear receiving chamber 37ᵇ and will flow through the forwardly opening passages 42 to the front chamber 33 and thus force the piston rearwardly. When the piston reaches its rearward position the passage 24 will then be in communication with the forward air receiving channel 37ª and the air will flow in the reverse direction through the rearwardly directed passages 39 to the chamber 34 thus forcing the piston forward. As the piston moves rearwardly from the position shown in Figure 1, the air in the chamber 34 will escape by way of the rearwardly opening passages 39, the forward channel 37 and the forward discharge port 29.

The forward movement of the air from behind the backwardly moving piston will be, however, retarded somewhat due to the friction in the passing of the air through the relatively long passages. Accordingly, there are provided in the piston body the radial ports 46 and 47 at the forward and back ends respectively of the piston 31, which open respectively from the passages 42 and 39 into the adjacent air channels 38ª and 38ᵇ. In addition to these short radial ports 46 and 47 each end of the piston body has formed therein the short axially directed ports 48 and 49 which respectively communicate only with the adjacent end channels 38ª and 38ᵇ as is clearly shown in Fig. 3. Both radial ports 46 and 47 and short exhaust passages 48 and 49 are referred to herein and in the claims as communicatingly leading from the end face of the piston to that portion of the cylindrical face of the piston adjacent the said end of the piston, whether same be through a circumferential channel or chamber in the piston or to the surface of the smooth piston and whether it be the said radial ports or short exhaust passages. "Leading to a channel" includes a channel in the piston end portion of the cylindrical face or in the cylindrical bore face. These radial ports 46 and 47 and short ports 48 and 49 together with the end channels 38ª and 38ᵇ provide for rapid exhaust of the air in the end chambers 33 and 34 of the cylinder into which the piston is being forced, such rapid exhaust taking place through the cylinder exhaust ports 29 and 30 with which an end channel 38ª or 38ᵇ is in communication. It will be seen upon reference to Figure 1 that when the piston 31 is at the forward position, the forward air channel 37ª is over the forward exhaust port 29 and the rearwardly leading air passage 39 is also in communication with the exhaust port 29 through channel 37ª. Also, with the piston in this position the rear air exhaust channel 38ᵇ is in communication with the rearward cylinder wall exhaust port 30. Thus when the piston begins to move rearwardly from the position shown in Figure 1 the air or compressed fluid residing in the rear chamber 34 has two ways of escape or, in other words, both exhaust ports 29 and 30 provide for the escape of the air or compressed fluid so that the reversal of the movement of the piston as it reciprocates in the cylinder can take place rapidly or, in other words, the retarding of the reversal of the movement due to air compression is reduced to a minimum and the piston is thus enabled to reciprocate at high speed due to the fact that substantially all the fluid pressure is removed after it was employed as a cushioning means and employed to impart an impulse as a rebound force in reversing the piston 31.

Where return of the piston towards chamber 34 in preparation for the delivery of a power stroke in the forward direction is desired, the modified piston construction shown in Figs. 7 to 10 may be employed. In Fig. 7 the cylinder is generally designated 10' and the air admission passage as 24' and the cylinder air exhaust ports are designated as 29' and 30' respectively. The piston of this modified construction is designated 50 and as shown it has the central circumferential starter groove lug comprising narrow lands 50ª and 50ᵇ on each side of the narrow circumferential starter groove 51. Central lug is flanked by the relatively wide air channels 52ª and 52ᵇ, corresponding to the channels 37ª and 37ᵇ respectively of the unit 31.

Between the forward end 53 of the piston 50 and the forward air channel 52ª is the narrow movable circumferential relief or exhaust channel 54 which is positioned to come into communication with the forward exhaust port 29' when the piston is at the limit of its rearward movement.

The rear air channel 52ᵇ, however, is separated from the back end 55 of the piston by the relatively broad band 56 which, when the piston 50 is at the limit of its forward movement, covers the rear exhaust port 30' as shown in Fig. 7. Thus, in this form there is not provided a rear circumferential air relief channel between the rear channel 52ᵇ and the back end of the piston as in the form of the piston first described (Figs. 1 to 6). This piston 50, however, may have the two rearwardly extending air passages 57ª and 57ᵇ which open through its back and at their forward ends open into the forward circumferential wide air channel 52ª, and the two forwardly extending air passages 58ª and 58ᵇ which open at their forward ends through the forward wall 53, and at their rear ends communicate with the rear circumferential wide air channel 52ᵇ as is clearly shown in Figs. 7 and 8.

Thus, the reverse movement of the piston 50 will not be quite so rapid as the exhausting does not have the advantage of a rear moving exhaust circumferential channel as 38 as shown in Figs. 1, 3 and 4 ("moving" as mounted on the reciprocating piston 50). However, the length of stroke of the piston 50 when driven forwardly towards the tool will be shorter and powerful because of the fluid pressure in the forward chamber 33 of Fig. 7 will have dropped suddenly to substantially no pressure at all. Said pressure escapes through short port 60 into exhaust channel or chamber 54, as well as directly through passageway 58 through radial port 59 and directly into cylinder exhaust 29'. Further, such escape for the fluid pressure in front chamber 33 is provided for sudden release by horizontal passageway 58 and into wide chamber 52ᵇ and then out cylinder exhaust 30'. Thus, the piston 50 is permitted to move forward under the full force of the newly admitted fluid pressure entering from inlet 24', wide chamber 52ª and horizontal passages 57ª and 57ᵇ to press upon rear wall 55. However, the piston 50 will only travel a short distance before inlet port 24' opens into 52ª whereupon the piston 50 will be suddenly stopped and started upon its reverse reciprocation, after delivering a powerful blow with a short stroke. The difference in the rate of travel forward as compared to the rate of travel rearwardly creates an unbalanced reciprocation. The distance traveled by the piston 50 beyond the inlet 24' in moving forwardly and with the tool in place with its stop shoulder 14ᵇ against the projection 14ª of the cap nut 14, as in Fig. 14, the stroke will be shorter than when the projection 14ª is drawn back so that shoulder 14ᵇ is not against projection 14ª of cap nut 14, as in Fig. 15. Thus, the piston will be permitted to travel further forwardly into the front chamber 33 before engaging the shank of the tool then when the shank of the tool is projected fully rearwardly as above.

By traveling further into the front chamber 33 the piston 50 will leave the inlet port 24' open longer on its rearward return and thus the piston 50 is driven further into the rear end cylinder chamber 34 which results directly in greater compressing of the unexhausted air in the said chamber 34. This high compression provides for a powerful rebound and less consumption of fresh inlet fluid pressure. Such inlet fluid pressure enters during the time the piston 50 is traveling rearwardly in building up such rebound pressure in chamber 34. By slightly removing the tool engine from the stop shoulder 14ᵇ of the shank of the tool, the piston 50 in operation is driven further into the rear end cylinder chamber 34 because the inlet port 24' will be open longer into the rear wide channel 52ᵇ. Likewise the piston 50 will be driven further into the forward chamber 33 striking the tool with a very heavy blow. Thus, is made clear that applicant provides for a variable length of stroke depending upon how close the mechanism is held to the shank of the tool.

By having the tool fully inserted so the stop shoulder 14ᵇ is against the projection 14ª, then the piston travel is shorter in the forward movement than in the rearward movement. The reason for this is that the piston has the solid tool shank as a stop in its forward movement and only a compressible fluid medium in the rear end cylinder chamber 34.

By gradually moving the engine or mechanism back from the end of the tool shank 18, a point will be found where the piston travel will be the same on each side from the inlet port and so a different vibration and increased power will be developed than that obtaining when the tool shank is fully inserted (as in Fig. 14). On the other hand by continuing moving the engine further than the point just mentioned above, that is where the piston travel is the same on both sides of the inlet port 24, it will be found that the reverse of the type of vibration exists than stated above when the tool shank is fully inserted because in the one case the long stroke of the piston is rearwardly of the inlet port while in the other the long stroke is forwardly of the inlet port.

Thus, there are three positive different vibrations, power and speeds developed on the same setting of inlet fluid pressure for the form shown in Fig. 1 as follows:

(1) With the tool shank fully inserted, there results a short travel of the piston forward of the inlet port 24, with a longer travel rearwardly of the inlet port providing an unbalanced power, unbalanced speed and unbalanced vibration.

(2) With the tool shank stop shoulder 14ᵇ slightly forward of the projection 14ª, that is, with the engine withdrawn slightly from the tool shank shoulder 14ᵇ; here the piston 31 travel will be the same on both sides of the inlet and gives a balanced motor.

(3) With the tool shank stop shoulder 14$^b$ still further forward of the projection 14$^a$, that is, with the engine withdrawn (Fig. 15) further from the tool shank; here we get slower speed because the piston must travel further. But the force of the blow is greater because the inlet port stays open longer both on the forward and rearward reciprocation. Also this position gives a reverse of the vibration of the first instance, i.e. paragraph 1 above.

Also, there are three positive different vibrations, power and speeds developed on the same setting of inlet fluid pressure for the form shown in Fig. 7, i.e. with moving exhaust channel or chamber in front end of piston.

(1) With the tool shank fully inserted; a short travel of the piston forward of the inlet port 24', with a longer travel rearwardly of the inlet port 24' provides an unbalanced power, unbalanced speed and unbalanced vibration.

(2) With the tool shank stop shoulder 14$^{b'}$ slightly forward of the projection 14$^{a'}$, that is with the engine withdrawn slightly, from the tool shank shoulder 14$^b$; here the piston 50 travel will be the same on both sides of the inlet and yet gives an unbalanced power, speed varying in one direction (being faster) from that in the other (being slower) and unbalanced vibration.

(3) With the tool shank shoulder 14$^b$ still further forward of the projection 14$^a$, that is, with the engine withdrawn further from the tool shank; here we get slower speed because the piston must travel further. But the force of the blow is greater because the inlet port stays open longer both on the forward and rearward reciprocation. Also this position gives a reverse of the vibration of the first instance above, i.e. No. 1 above.

In the above, a total of six different types of vibrations are disclosed—three for the piston of Fig. 1 with moving quick exhausting channels or chambers at each end of the piston and three for the piston of Fig. 7 with a moving quick exhaust channel or chamber in the forward end only of the piston. It would only normally be desired to have the quick moving exhaust in the front end to secure the power stroke on the forward movement of the piston when only a single quick moving exhaust is to be provided in the piston. However, let it be definitely remembered, that there are some uses where the single moving quick exhaust channel or chamber is desirable in the rear end of the piston with a solid lug in the front end (in short just the reverse of that shown in Fig. 7). This would be the case in mechanism for use in extractors or pullers, as in removing nails.

The operation of the first group of three, i.e. the group related to the form shown in Fig. 1, has a sudden and abrupt fast reversal of the piston due to the quick exhausting and admission of fresh inlet air just after or almost simultaneous the piston has delivered its blow when moving forward. The sudden stopping and reversal of the piston when moving backwardly is likewise due to the admission of fresh inlet air and quick exhausting.

In contrast to the form of Fig. 1, in the form of Fig. 7, the reversing is accomplished primarily by the piston moving against the trapped unexhausted air which is then augmented by fresh inlet compressed air giving the piston a quick return. This latter gives a slower frequency type of vibration in all three stages while in Fig. 1 the type of vibration in all three stages is sharper and more violent type of vibration and of a different frequency.

One method that the speed and power of operation of the piston in the engine of the present discovery and invention can be accelerated and increased respectively and the length of stroke proportionately reduced is by increasing the number and size of passages 48, 46, 42, 44, 49, 47, 39, 41 for removing or exhausting the air in the cylinder from the end thereof toward which the piston moves.

Another method that the speed and power of operation of the piston in the engine of the present discovery and invention can be increased and the length of stroke proportionately reduced is by enlarging the volume of inlet air either by increasing the number of inlet longitudinal or horizontal passages in the piston or enlarging their size for the admission of compressed fluid. (See Fig. 12.) My discovery and invention shows that by increasing the speed the power is also increased.

The above discloses how the mechanism of my discovery and invention can be changed structurally to provide for varying the speed, power of operation, length of piston stroke, and type of vibration. Still another method, one of the most important, novel and outstanding of my discovery and invention, of varying the length of stroke, speed, power and type of vibration of my discovery and invention is directly under the manual control and manipulation of the operator. This operational method comprises the adjusting of approach or closeness with which the piston stem of the engine or mechanism of my invention is adjusted by the operator to the end of the tool shank. It will be understood that the stop shoulder on the tool shank provides a maximum limit distance to which the shank of the tool may enter into the engine or motor mechanism. In most cases or use of my discovery or invention the said stop shoulder on the shank of the tool could be completely omitted, which proves conclusively that the control or adjustment of length of stroke, speed, power and type of vibration is directly in the hands or under the control of the operator in the closeness with which the operator holds the engine to the end of the shank of the tool.

In Figs. 11 to 13 a piston is illustrated wherein additional passages are shown for removing from the forward end of the piston at a more rapid rate, the air in the forward end of the cylinder when the piston starts to return on its power delivering stroke. The piston here illustrated is generally designated 10'' and it will be readily seen that its construction is similar to the piston shown in Fig. 7 in that it has the narrow central lug comprising narrow lands 62$^b$ and 62$^c$ and narrow starter circumferential groove 62$^d$ flanked on both sides by the wide and pressure receiving forward channels 63$^a$ and the wide rear fluid pressure receiving channel 63$^b$, while at the forward end there is located between the forward channel 63$^a$ and the front end of the piston, the moving circumferential relief or exhaust channel or chamber 64. The back end of the piston between the rear channel 63$^b$ and such end has the relatively wide band portion 65 which functions to cover the rear air cylinder escape port for the piston cylinder, corresponding to the port 30'.

In this piston there are formed any desired number of longitudinally extending rearwardly opening longitudinal passages 66, here shown as three. However, it will be understood that use may be made of less or more passages which open into the rear end of the cylinder and at their forward ends open into the forward wide circumferential channel 63$^a$.

A corresponding number of forwardly opening air passages 67$^a$, 67$^b$ and 67$^c$ formed in the piston which at their rear ends open into the rear channel 63$^b$. Such number of passages 67$^a$, 67$^b$ and 67$^c$ is shown as three and in addition to these three passages, each of which is in communication with movable exhaust channel or chamber 64 by way of a radial port 68, an equal number herein chosen for illustration (same may be more or less longitudinal) of blind or short passages or ports 69 is provided which open through the forward end of the piston and into the movable circumferential relief or exhaust channel or chamber 64. Thus, it will be seen that the provision for rapid removal of air from the forward end of the piston to prevent or to reduce to a minimum the compression of the air therein which would retard the forward movement of the piston, is accomplished and as a result the piston can be actuated at an exceedingly high rate of speed.

It will be understood that the piston 10″ shown in Figs. 11 to 13 operates in a cylinder in all respects corresponding to cylinder 10 of Figs. 1 and 7.

The manner of adjustment of the length of the stroke, power, speed and type of vibration by the operator is illustrated in Figs. 14 and 15. In Fig. 14, the engine is shown of the form of Fig. 1 with the end of the engine stem 32 against the end of the tool shank 18 of the tool— the shank being fully inserted so that the stop shoulder 14b is flush against the projection 14a. In Fig. 15, the engine is shown of the form of Fig. 1 drawn back from the shoulder 14b of the tool shank 18 of the tool so that the tool shank is not fully inserted in the engine, as shown by the space between the shoulder 14b of the shank and the projection 14a. Thus, for the stem 32 of the piston to engage the end of the shank 18 of the tool, it must make a longer stroke. In Fig. 16, the piston is shown in perspective in order to facilitate an understanding of its construction.

The modified form shown in Fig. 17 shows a hill and valley type of piston without channels or chambers in the end lugs of the piston. Herein, cylinder 80 has exhaust ports 81 and 81a leading from the cylinder bore to the atmosphere and said cylinder also has inlet 82 for the admission of a fluid pressure medium. The cylinder wall has circumferential exhausting channels 83 and 84 and it also has cylinder end chambers 85 and 86. A bushing 87 is provided in the forward end of the cylinder.

Within cylinder 80 is reciprocally mounted a piston 88 having end lugs 89 and 90 and central lug. The central lug comprises narrow lands 92 and 93 with narrow circumferential starting groove 94 therebetween, which groove has a starting orifice 95 which has in this modified form its own passageway 96 leading to and through an end face of the piston. On each side of the narrow lands 92 and 93 are relatively wide pressure receiving channels 97 and 98. These channels extend from said lands to their repective forward end lug and respective rear lug 90. The piston has a longitudinally extending passageway 99 leading from port 100 in wide channel 98 to and through the face of the forward end of the piston 88. There may be a plurality of such passageways.

Lug 89 has one or a plurality of short exhausting passageways 101 of the same character as passageway 48 or 49 shown in section in Fig. 3. Also said lug 89 has a passageway 102 leading from the lug cylinder face of the piston into passageway 99.

Likewise forward wide channel 97 has port 103 which communicates with passageway 104 leading to and through the remote end face of the piston. Lug 90 has a passageway 105 leading from the lug cylindrical face of the piston into said passageway 104. Also said lug has one or a plurality of short exhaust passageways 106 leading from the end of the piston to the adjacent portion of the cylindrical face of the piston 88, said short passageway being of the same form as 48 or 49 shown in section in Fig. 3.

The modified form shown in Fig. 18 shows a smooth cylindrical faced piston 110 having its surface interrupted only by quick exhaust channels 111 and 112 and by wide ports 113 and 114—the width being important to permit of adjusting the stroke as the width of wide channels 37a and 37b of the form shown in Fig. 1. Said ports 113 and 114 communicate with longitudinal passages 115 and 116 respectively. Starter orifice 117 is equidistant from transverse planes passing through the center of ports 113 and 114. Said starter orifice 117 communicates with passage 118 leading to the end face of the piston 110.

Short quick exhausting passage 119 of the same character as passage 48 of Fig. 3 communicatingly leads from the end face of piston 110 to adjacent front channel 111. There may be one or a plurality of said short exhausting passages 119 depending upon the speed, type of vibration, length of stroke and power desired. Also radial port 121 establishes communication between channel 111 and longitudinal passage 115, there may be one such radial port for each longitudinal passage.

Short quick exhausting passage 122 of the same character as passage 49 of Fig. 3 communicatively leads from the end face of piston 110 to the adjacent rear channel 112. There may be one or a plurality of said short exhausting passages 122, depending upon the same factors as above for short passages 119. Also, radial port 123 establishes communication between channel 112 and longitudinal passage 116—there may be one such radial port for each longitudinal passage.

The modified form shown in Fig. 19 shows a smooth surface type of piston without quick exhaust transversely disposed channels or chambers in the end of the piston. Herein cylinder 130 has exhaust ports 131 and 132 leading from the cylinder bore to the atmosphere and said cylinder also has inlet 133 for the admission of fluid pressure medium. The cylinder wall has circumferential transversely disposed exhausting channels 134 and 135 and it also has cylinder end chambers 136 and 137. A bushing 138 is provided in the forward end of the cylinder, with plate 139 closing the rear chamber 137. Cap 140 with projection 141 closes the front end of the cylinder.

Within cylinder 130 is reciprocally mounted a piston 142. Wide ports 143 and 144 in the piston communicate with longitudinal passages 145 and 146 respectively—the former opening into chamber 136 and the latter into chamber 137. A starting orifice 147 has in this modified form its own passageway 148 leading to and through one end face of the piston. Preferably wide ports 143 and 144 are disposed equidistantly from transverse planes through the center of ports 143 and 145.

One or a plurality of short quick exhausting passageways 149 of the same character as passageway 48 shown in section in Fig. 3 lead from the end face of piston 142 to the adjacent end portion of the cylindrical face of piston 142. Also said cylindrical face end portion has a port 150 leading from the cylinder face of the piston into passageway 145.

Likewise the rear end of the piston has port 151 which communicates with passage 146. One or a plurality of short exhaust passageways 152 lead from the end of the piston to the adjacent portion of the cylindrical face of the piston 142, said short passageway being of the same form as 48 or 49 shown in Fig. 3.

The operation of this modified form Fig. 17 is in general similar to the forms of Figs. 1 and 7. However, in this form the exhausting channels 83 and 84 are cut in the bore face of the cylinder 80 so that when ports 102 and short passage 101 in lug 89 and ports 105 and short passage 106 in lug 90 during reciprocation register with said channels 83 and 84 respectively, the exhaust occurs through said ports and short passages respectively to the atmosphere through cylinder exhaust 81 and 81a respectively.

Thus, very direct and short routes for the exhausting of the pressure after use is provided. This permits very high frequency of reciprocation and powerful blows of the piston.

The operation of the modified form Fig. 18 is in general similar to the forms of Figs. 1 and 7. However, in this form, a smooth surface piston is shown with channels 111 and 112.

The operation of the modified form Fig. 19 involves the smooth piston with quick exhausting channels disposed in the bore face of the cylinder.

Thus, it is seen that the novel invention of the fundamental means of providing quick exhausting by means of short passages as 101 leading from the end face of the piston to the adjacent portion of the cylindrical face of the piston as 83 in cooperation with transversely disposed channels either in the end portions of the piston cylindrical face or in the bore face of the cylinder and the ports 102 leading from passage 99, establishes a quick, short escape route for exhausting. All this eliminates the usual friction of long passages. These factors contribute in a large way when speeds of reciprocation of 14,500 to 40,000 or higher per minute are involved.

Particularly, it is manifest, that the factors of the above said means for quick exhausting are applicable to various types of pistons, namely:

(a) "Hill and valley" type (see Figs. 1–6) with said means disposed in both end portions of the piston;

(b) Figs. 7–10 with the said means in one end of the piston only;

(c) Fig. 17, "hill and valley" type with the channels in the cylinder bore face of the cylinder (one channel of course can be omitted as in Fig. 7);

(d) Fig. 18—smooth piston type with channels in the end portions of the piston cylindrical face (one channel of course can be omitted as in Fig. 7); and (e) Fig. 19—smooth piston with channels in the cylinder bore face (one channel of course can be omitted and the operation being the same as set forth in detail for Fig. 7).

It is remarkable that the said means for quick adjustment applies to so wide a range of types of pistons and cylinders. The smooth type of piston provides greater speeds of reciprocation, with much less consumption of fluid pressure (have not wide channels to fill and empty upon each reciprocation) blows of greater power (piston is heavier due to absence of all channels), and a plurality of times longer life for the engine or motor (due to the uninterrupted plain wearing surface).

Moreover, a further remarkable feature of the range of utility of the said quick short exhausting means is the fact that all the piston forms shown in Figs. 17, 18 and 19 may be employed interchangeably in cylinder of the form shown in Fig. 19. Also the pistons of Fig. 1 and Fig. 7 may be employed in the cylinder of the form shown in Fig. 19. Thus, it is made possible to have a quick and whole range of change of type of pistons to perform at the various speeds, length of stroke, power, and type of vibration. All of said pistons with same setting of fluid pressure medium will give the said variations in speed, length of stroke, power, and type of vibration.

Thus, the said combination of factors, short passages, ports to passages and channels (either in piston or cylinder) provides constructional variations by means of which a given mechanism may be designed to meet the characteristic requirements of high reciprocation speed, length of stroke, power and type of vibration for practice of my discovery and invention.

One may have an engine designed by determining the porting, with weight and diameter of piston, lugging, inlet means, and head clearance in cylinder end chambers to operate a given speed when working on standard pressure from 90 to 100 lbs. However, the character of the material of the mass may require for optimum speed of operation and efficiency, a further control of the length of stroke, power of stroke, speed of reciprocation and type of vibration and this is provided by employing the operational methods of my invention.

MODE OF OPERATION

The mode of operation of my discovery and invention is set forth in large part above in describing the structure and functional relationships of the parts, elements, factors and steps of my discovery and invention. The following examples and demonstrations disclose process and operations which reveal the efficiency and novel results of the first form and manner of practice of my discovery and invention.

In connection with these examples and demonstrations, it is manifest that the regulation of the length of stroke, speed and power of the blow and type of vibration of the piston of my invention does not depend upon pressure with which the work performing element is pressed by the operator against the solid mass on which work is to be performed. The following demonstrations or examples give ample proof of this.

Demonstration No. 1

With the apparatus embodying my invention, the work performing element in the form of a wood chisel may be applied to a sheet or panel of ⅜ inch thick plywood of 4 x 8 feet dimensions weighing many pounds without any suspending means other than that of the wood chisel entering the edge of said plywood mass. The chisel in operative relation to the engine mechanism of my invention is applied or started into one edge of the plywood about a fraction of an inch, that is, until the chisel sticks in the plywood sufficiently to support the said sheet of plywood. This is done with the chisel blade disposed diagonally of the plane of the sheet and with the axis of the tool shank parallel to the plane of the sheet. Thereafter, the operation of the chisel will support and lift the sheet of veneer by reason of its cutting operation without the sheet being otherwise supported in any manner except by hand through the means of the said chisel. The sheet by such operation will be fed into the operating chisel. This positively establishes and proves that it is not the pressure or force with which the operator applies the tool since the sheet of veneer is entirely suspendedly supported by the operating chisel. It will be understood that the chisel has a flange or shoulder stop $14^b$ and with the fingers straddling the shank and against the said shoulder stop the panel is supported by the hand which at the same time leaves the engine free for adjustment by same hand in adjusting the closeness with which the engine is held to the adjacent end of the shank of the chisel.

Be it noted that the engine mechanism of my invention in the above illustration has a weight of the order of approximately one-half ounce (½ oz.) for the engine complete, that is, without the weight of the chisel, which chisel in itself weighs several times the weight of said power or engine mechanism of my invention. But, of course, the above does not imply any limitation as to size of motor which may be built. Such motor may be built to meet requirements, even weighing tons.

Demonstration No. 2

Among other features established, the following examples or demonstrations firmly fix the fact that it is not the pressure with which the work performing element is pressed by the operator into the solid mass which provides the control by the operator in developing the length of stroke and speed in creating the required condition within the mass for the process of my discovery and invention.

A wood mass may be fastened securely as in a vise. Then the chisel in operative position in the engine mechanism of my invention may be applied. After starting the chisel into the mass a fraction of an inch, thereafter a considerable force of pulling backward on the chisel having the fingers straddling the chisel shank and pulling against the stop shoulder of said shank may be exerted upon the chisel and still the chisel, resisting such backward pull, will continue advancing in cutting operation in the wood mass.

Demonstration No. 3

When the chisel or sheet metal cutting tool, in operative relation to the invention of power mechanism of my invention, is applied and started in cutting operation to a sheet metal tubular structure as a can or stove pipe held in the hand with the sheet metal cutting tool inclined at an upwardly directed angle so as to keep the tubular structure from falling off the cutting tool, then as the operation continues, the tubular structure now freely suspended on the sheet metal cutting tool will automatically revolve or feed toward the tool in cutting operation, giving the appearance to observers and feeling to the operator that the tubular structure is being pulled into the working tool.

Demonstration No. 4

Similar to the domonstration set forth next preceding, the sheet metal cutting tool which may be of several designs will perform in like manner upon a plain sheet of metal, only in this case, instead of revolving the tube as explained above, the flat sheet stock will automatically be drawn or fed into the tool by itself without any other feeding force than that provided by the tool itself, the tool and the engine being held in the fingers and hand respectively as set forth above.

Demonstration No. 5

Again as another illustration and proof of one of the astonishing properties of my discovery and invention is the following:

A broom straw may be held fast at one end, and of a length of 6 to 10 inches to provide resilience at the unsecured end. To such straw a chisel in operative relation in an enginee or power mechanism embodying my invention may be applied to the free end remote from the mounting or holding means. The said straw can be severed at desired intervals of a half inch or inch into small pieces starting from the top without any support of the straw on the free end against the action of the operating chisel. If there was not something unusual about the operating of the chisel, the straw normally would be forced away from the cutting edge of the chisel so that it would be difficult to cut the same. However, with the invention of my discovery, the said straw is definitely and readily severed. Here, as in the previous example, the straw apparently is drawn toward the cutting edge of the chisel.

Demonstration No. 6

A block of wood approximately one inch in thickness and harder than that employed in the manufacturing of an ordinary pine wood kitchen match may have the match stick pierce or caused to be put through said block by the process of my discovery. The match may be set on fire to remove the chemically coated end and thereby provide a charred end. This end may be put through said block by the process and mechanism of my invention and some of the char will still remain on the end piercing in and through the piece of wood. The opposite end (one engaged by the mechanism) will show practically no upsetting. This "no upsetting" also applies to the piercing end of the slender match stick.

Thus it is clear that "pressure" is not required or the force which puts the match stick through the block because such procedure would break or crush the delicate match stick. Applicant's procedure does not even leave any substantial evidence of upsetting of the ends of the match.

The above illustrations make it definite that such are not the operations of tools of common design and they constitute one line of evidence or proof that a new process or art is provided by my discovery or invention. It is to be noted that the tool shank is free to reciprocate under action of the piston.

In ordinary operation, the work performing tool or element drives the work from the tool in cutting with a tool such as a chisel. In contrast with my discovery of the art or process, the solid mass on which work is being performed is apparently drawn toward the tool as shown in some demonstrations, and this apparently by the nature of its operation.

Referring to the above demonstrations, the following general summary statement may be made:

Normally in a large percentage of the common reciprocating tools of today, a positive or definite length of travel for the piston is established for a given device designed for a particular work. Generally upon ordering a reciprocating engine, attention is specially given to the length of the tool shank which is to be used in the engine, that is, the details of the character of work for which the engine is ordered and carefully specified as to the length of shank of the tool to be operated. If the shank of the tool of such device is too short even by thousandths of an inch, then the piston in reciprocation will not hit the top of the shank with its maximum blow as it may scarcely reach the same. In some cases, it will not strike the shank at all. Likewise, if the tool shank is too long, then the piston will strike too soon, that is, before it reaches its optimum power stroke position. Thus, in ordering a reciprocating power engine of common practice design, special attention must be given to specifications of the length of the tool shank to be employed therewith.

The foregoing disclosure and recitation of specific operating examples serve to demonstrate various constructional features by means of which the requisite length of stroke, speed, power, and vibration condition in a given work piece may be attained, and the operational method whereby these factors may be collectively varied and controlled by the operator by relatively adjusting the closeness of the end of the tool shank and the piston stem of the engine.

Another operational method for effecting selective control of the reciprocation speed and length of stroke also serving to generate a more effective condition of vibration in the work mass is by selective adjustment and control of the fluid medium input rate and, as a consequence, the fluid medium input pressure. It will be apparent that such regulation may be effected conjunctively with variation in spacing between the piston extension and tool shank in the form of the invention illustrated in Figs. 1 through 6, for example, by selective control of the setting of valve control button 28, or may be effected in a reciprocatory tool involving direct connection between the piston and the tool by means of similar selective operational control of the fluid medium input rate and pressure by means of one or more variable values in the fluid medium inlet line to the engine.

In order to exemplify this latter operational method according to the present invention and discovery, Figs. 20 through 22 respectively present longitudinal section, front, and partial transverse section views of such latter typical form of mechanism.

Thus, Figs. 20, 21, and 22 present a reciprocatory tool of a type similar to shear mechanism disclosed and claimed in my copending application Serial No. 301,314, filed July 28, 1952, and issued as Patent No. 2,763,060 on September 18, 1956, wherein the tool is a shear blade connected directly to an extension from the piston of the reciprocatory engine, and wherein said mechanism comprises one or more selectively and operationally controllable valves for regulating the fluid medium inlet rate and pressure, two such valves being shown by way of illustration, as more fully discussed hereinafter, it being understood that only one such valve may be employed in certain applications, as desired.

Turning to a specific consideration of the constructional features of the mechanism illustrated in Figs. 20, 21, and 22, a cylinder 150 has an end plate 151 closing one end thereof, with a cutting head 152 secured to the cylinder 150 by a plurality of securing elements 153 passing through said end plate 151. The cutting head 152 is angularly disposed and formed of two opposed longitudinally registering body members 154 and 155, body member 155 being removed for clarity of illustration in Fig. 20, which body members 154 and 155 are secured together by suitable retaining means such as bolts 156 (see Fig. 20) and are each provided with a recessed channel, channel 157 in body member 154 being shown, which channels form a guideway for and accommodate a flexible reciprocatory motion transmitting means such as cable 158 connected at one end to cutting blade 159 as by screw element 160 and connected at the other end to extension 161 from reciprocatory hill-and-valley piston 162, such latter connection being by screw element 163. Shear blade 159 cooperates with an anvil 164 to form the working elements of the tool. It will be readily understood that the direct connection between cutter blade 159 and extension 161 of reciprocatory hill-and-valley piston 162 may be of any appropriate form, such as a straight rod in the event the cutting head is not angularly disposed, or such as a suitable reciprocatory motion transmitting rack and gearing, as desired. It will also be apparent that the mechanisms disclosed and claimed in my said copending application Serial No. 301,-314, filed July 28, 1952, are advantageously adapted for practice of the method of operation of the present invention and discovery.

In the form of mechanism suitable for practice of a mode of operation according to the present invention, as illustrated in Figs. 20 through 22, reciprocatory hill-and-valley piston 162 comprises hill-lugs 165 and 166, respectively at each end of piston 162, and a third hill-lug 167 intermediate said end hill-lugs 165 and 166, with lateral valleys 168 and 169 on each side of said intermediate hill-lug 167. Said intermediate hill-lug 167 is provided with a fluid pressure inlet starting groove 170. One or more connecting inlet conduits, two shown by way of example at 171 and 172, communicatively connect lateral valley 168 with end portion 173 of cylinder 150. One or more inlet conduits, one of a lateral pair being shown by way of example in the section view of Fig. 20 at 174, communicatively connect lateral valley 169 with the end portion 175 of cylinder 150. A seepage starting conduit 176 extends from starting groove 170 to conduit 172 whereby the fluid medium under pressure is caused to enter conduit 172 and build up pressure in end portion 173 of cylinder 150 and whereby the piston 160 is caused to move whenever the said piston 162 stops at dead center with groove 170 communicating with inlet conduit 180. Exhaust ports 181 and 182 of short length advantageously extend directly and laterally through the side wall of cylinder 150, generally in the manner of arrangement of exhaust ports 29 and 30 in the embodiment of the invention illustrated in Fig. 1.

In the mechanism illustrated in Figs. 20 and 21, the construction of cylinder 150, piston 162, and tool head 152 is essentially similar to that form of mechanism disclosed in my said copending application Serial No. 301,-314, filed July 28, 1952, and issued as Patent No. 2,673,-060 on September 18, 1956, and the construction thereof to provide high frequency reciprocation of cutter blade 159 with respect to anvil 164 by means of a direct connection between said cutter blade 159 and an extension 161 of piston 162 is likewise similar.

As previously indicated, the forms of mechanism presented in Figs. 20 through 22, and in Fig. 23 are ideally suitable for practice of modes of operation contemplated by the present invention wherein the frequency of tool reciprocation and length of piston stroke are operationally adjusted by means of regulation of the fluid medium input rate and pressure. Accordingly, detailed consideration of the fluid medium input line and valve control means for accomplishing such operational control will next be given specific consideration. Referring specifically to Figs. 20 and 22, cylinder 150 has secured thereto an end cap 183 which has pivotally mounted thereon a manually actuated control handle or trigger 184 and the end cap 183 includes threads accommodating an inlet hose and fitting, a segment of which is shown at 185, for delivering fluid medium under pressure to the mechanism from a source of supply, not shown. The incoming fluid medium passes from said hose and fitting 185 into channel 186 of selectively variable cross-sectional area, such selectively variable cross-sectional area being pre-settable by means of rotatable high friction valve 187, said valve 187 being slightly tapered downwardly away from screw head portion 188 thereof and retained in a channel in said end cap 183 by retaining means such as a threaded bolt and nut means 189. Through the variable cross-section provided by valve 187, the fluid medium passes from the inner portion of channel 186 to a second variable cross-section, such as provided by a ball check valve mechanism comprising ball 190, spring 191, and retaining bolt 192 and actuating rod 193, the arrangement being such that the flow cross-section provided by the ball check valve mechanism with respect to ball valve seat 194 under action of control handle 184 regulates the input rate and pressure of the fluid medium delivered to input channel 180 in housing 150 of the reciprocation engine, it will be apparent that equivalent valves for this purpose may be used in lieu of the ball check valve mechanism.

In the mode of operation of the mechanism of Figs. 20 through 22 contemplated by the present invention, wherein the reciprocation rate and length of stroke of the tool is operationally adjusted by adjusting the fluid medium input rate and pressure, either control valve 187 or the ball check valve comprising ball 190 or both may be employed to selectively adjust and maintain the requisite fluid medium input rate and pressure to establish an appropriate reciprocation rate and length of stroke for the tool in developing a characteristic sympathetic condition of vibration in the mass being worked.

Typifying these modes of control, in the event a large number of work pieces of the same material and substantially the same physical dimensions are to be processed, the appropriate tool reciprocation rate may be ascertained by maintaining manual control lever 184 at a maximum open or other predetermined, non-interfering position of ball 190, the fluid medium input rate and pressure being varied by selective setting of valve 187 through regulation of screw head 188 thereof while operating the tool on a test work mass until a characteristic sympathetic vibration condition is generated in the test work mass unit, after which setting of valve 187 the characteristic sympathetic vibration condition in any like mass being worked may be duplicated for each operation merely by shifting manual control valve 184 to its maximum or other predetermined non-interfering setting which does not restrict the fluid medium flow. In the event a variety of materials and/or physical dimensions are encountered in a series of masses being worked, control valve 187 may be merely pre-set at a maximum or other appropriate opening and the requisite reciprocation rate and length of stroke to successively establish a characteristic sympathetic vibration condition in each successive work piece can be achieved by selecting intermediate settings of manual control valve 184, it being apparent in such latter event that the selective operational control of the fluid medium input rate and pressure and corresponding reciprocation frequency and length of stroke of the tool are established solely by selective action of manual control arm 184 through ball check valve 190 actuated thereby.

As above indicated, various other forms of mechanisms involving a direct connection between a reciprocating element of a fluid pressure operated engine and the tool may be employed in practice of the present invention and discovery, as well as that form of mechanism illustrated in Figs. 20 through 22, such additional and typical mechanism having been disclosed and claimed in my said copending application Serial No. 301,314, filed July 28, 1952, and issued as Patent No. 2,763,060 on September 18, 1956. In order to more fully disclose a further form of such appropriate mechanism, involving rack and gearing mechanism connected between the tool and the reciprocating element of the engine as a reciprocatory motion transmitting means, Fig. 23 presents such additional form of mechanism generally in the form previously disclosed and claimed in said prior copending application.

Turning to a specific consideration of the mechanism illustrated in longitudinal section in Fig. 23, it being understood that such mechanism is structurally the same as the mechanism presented in Figs. 20 through 22 unless otherwise indicated, whereas non-identical but similar elements are indicated by prime numerals, cylinder 150' of a fluid pressure operated reciprocatory motor has an end plate 151' closing one end thereof. A head 200 is secured to the cylinder 150' by a plurality of securing elements such as bolts 153' passing through said end plate 151'. The head portion 200 is provided with a cutout portion 201 and rotatably supports therein a shaft 202. Head portion 200 also mounts by means of bolts 203 an anvil 204. A gear 205 having a plurality of spaced teeth 206 is mounted on shaft 202 and a pair of right-angularly related slots 207 and 208 is disposed in the head 200 for the assembly of parts therein. A rack 209 is slidably positioned in the slot 207 and the rack 209 is provided with teeth 210 which mesh with the gear 205. The projecting end of the rack 209 is positioned in a socket 211 which is formed in one end portion of extension 161 of piston 162 of the fluid pressure operated reciprocating engine. The operation of said engine results in the piston 162 moving back and forth in cylinder 150'. The rack member 209 may be maintained in the socket 211 of the extension 161 of piston 162 by means of a set screw 163'. Slidably arranged in the other slot 208 is a movable cutting member 159'. The cutting member 159' is mounted for reciprocatory movement toward and away from the lower underlying portion of anvil 204.

The movable cutting member 159' is provided with a rack 212 comprising a plurality of teeth 213 which match with the gear teeth 206, and arranged on one side of the rack 212 is a thrust plate 214 engaged by adjusting screws 215. The rack member 209 is also in sliding engagement with a thrust plate 216 which is engaged by an adjusting screw 217. Thrust plate 218 held by adjusting screws 219 is disposed below gear 205. The cylinder 150' has secured thereto an end cap 183', as by bolts 220, which has pivotally mounted thereon a trigger 184 and the end cap 183' includes means accommodating a hose fitting 185' which delivers fluid medium under pressure from a suitable source of supply, not shown. The incoming fluid medium passes from said hose fitting 185' through passage 186' to a ball check valve mechanism comprising ball 190, spring 191, closure bolt 192, and actuating rod 193 manually controlled by said pivotally mounted trigger 184, it being apparent that according to the present invention and discovery, the reciprocation frequency and length of stroke of piston 162 may be operationally controlled by selection of intermediate positions of ball 190 with respect to valve seat 194, as desired.

It will be likewise apparent that the inlet conduit comprising passageway 180 in housing 150' and the passageways in piston 162 are the same as presented in connection with the mechanism illustrated in Fig. 20. Suitable exhaust conduits 181' and 182' are arranged, in this embodiment of mechanism suitable for practice of the present invention and discovery, to discharge through passages in end plate 151'.

Thus, Fig. 23 will be seen to present a mechanism involving another form of direct connection between a reciprocating element of the engine and between the tool acting on the mass being worked, and involving a further typical form of mechanism for practice of the present invention, wherein the fluid medium input rate and pressure are controlled by selective adjustment of a single valve mechanism in the fluid medium input line to develop the critical condition in the work which characterizes the present invention and discovery.

By virtue of applicant's invention, a free moving piston is provided free of any sliding valve thereon and having the valving action taking place between the cylinder and piston directly, whereby a considerable range of travel for the piston is established which permits control and adjustability of the length of stroke, speed, force of the blow of the piston, and type of vibration developed, either by variation in the spacing between the piston and the tool shank, or by variation in the fluid medium input rate and pressure, or both. By way of showing greatly increased results, a device embodying my invention and operating according to the discovery of my method, and weighing many times less than a competitive tool designed to cut or perform the same operation, has been operated and performed the operation in a fraction of the time of that of the competitive tool. Also by way of showing greatly increased results, devices embodying my invention and operating according to my said method have definitely proven that they have more power, far less weight, and employ far less fluid pressure medium than standard competitive tools designed to do the same general operation.

The explanation on the basis of pure science of the above is not fully understood or established, and of course it is academic in the law that an inventor need not know the scientific explanation of his invention, it being sufficient if he gives to the public such a disclosure of his invention as will enable the public to profit by his invention. The facts applicant does know are those set forth herein whereby the greatly improved operation, improved efficiency and results set forth are obtained and the devices are specially characterized as being of most economical manufacture. Also, such devices as my discovery and invention are characterized by having long life, which means their maintenance cost is low.

The process of my discovery and invention has established the fact that ordinarily and under most conditions the tools having cutting edges may be operated with the mechanism or engines or process of my discovery and invention a plurality of times longer than such tools when operated by reciprocating engines of common practice design in the field today.

The engine or mechanism employed in the above demonstrations or examples weighed approximately one-half ounce complete (including piston and cylinder), and the speeds varied from approximately 30,000 to 40,000 reciprocations per minute for said mechanism in said tests, said range provided for in determining the closeness of the engine to the tool shank end for adjusting the stroke, the speed, the power and type of vibration to create the most favorable vibration or disturbance condition in the mass being worked.

The above small engine operated a one and three-quarters inch work chisel, cutting a 2 x 4 piece of timber at approximately a 45° angle. The cut surface had a shine or polish as though it had been sanded and highly polished as a separate operation after the cutting. This same high polish develops in cutting metal as Duralumin and other metals.

The following statement about the cutting of metal supplies positive proof that the stroke, speed, power and vibration must be selectively adjusted if the engine is to create a particular condition of vibration or disturbance related to the properties and dimensions of the material of the mass being worked, which properties and dimensions characterize that particular workpiece. In connection with cutting a shaving or strip of metal referred to above, the shaving of metal, upon examination, revealed that, at the start when the engine with tool in operative position is first applied, tool marks appear until the operator adjusts the length of stroke, power, speed of reciprocation and type of vibration to create the most efficient condition of vibration or disturbance for that particular mass being worked.

After the proper control adjustment has been found for that material of the mass, whether it be by adjustment of the spacing between the shank of the tool and the piston or by selective setting of the fluid medium input rate and pressure, or both, the smooth and polished surface of the cutting commences and extends throughout the remaining length of the shaving.

Let it be noted that in those manufacturing processes where the same material with substantially the same cut is to be made repeatedly, then after the length of stroke, power, speed of reciprocation and type of vibration have been found or established, a tool having those standard characteristics can be designed especially to meet the particular requirements involved. This polishing or smooth cutting is due, it is believe, to the fact that the cutting tool receives such high speed and powerful driving blows that the high speed vibrations transmitted from the forward or cutting edge of the tool effectively create a sympathetic vibration condition in the mass which opens the way for the advancing edge of the tool. This "sympathetic vibration condition" applicant has found, starts to develop when the rate of reciprocation is not less than about 14,500 reciprocations per minute in practically relatively stiff or firm materials being worked, including metal, wood, and stiff paper, for example.

Operationally, the generation of a "sympathetic vibration condition" in a given work mass may be readily recognized when achieved, because of the notable and marked improvement in tool efficiency occasioned thereby. Given a reciprocatory tool capable of a sufficiently high reciprocation rate and power, such condition of sympathetic vibration is readily arrived at by trial for any given mass to be worked, since the working speed of the reciprocating tool is noticeably and sharply increased and is further operationally characterized by smoothness in tool action.

It has been noted that the ascertainment and maintenance of an appropriate reciprocation speed and length of stroke of the reciprocating tool, to develop increased efficiency in working speed and smoothness in tool action according to the present invention and discovery, is rather analogous to the manner in which the most appropriate and efficient operating conditions are selected in the art of cutting ferrous metal with an oxy-acetylene torch, where for a given torch nozzle design the oxygen input rate and pressure are balanced with respect to the acetylene input rate and pressure to produce a hotter flame, the efficiency of cutting being readily notable by speed of removal of the metal along the cut. A further analogy which has certain operational control aspects similar to that involved in practice of the present invention and discovery is found in the art of spraying paint, wherein when presented with a given spray nozzle assembly and a given paint consistency, the most advantageous spray in terms of efficiency of spraying and smoothness of coat may be readily achieved by selective operational regulation of the fluid medium input rate and pressure. It is considered that both of the above analogies have in common with the manner of reciprocating tool operation contemplated by the present invention and discovery the factor of ready operator recognition of the most advantageous operating conditions.

Under a condition of operation according to the present invention and discovery, wherein the mass being worked has a sympathetic vibration condition with respect to the reciprocating tool which results in notable and marked increase in working speed and smoothness in tool action, such results raise a strong implication of dynamic relation between the tool and the work mass itself. While the precise dynamic relationship of the mass and the tool under such a condition of sympathetic vibration as contemplated by the present invention and discovery may be only theorized, it is logical to consider that such sympathetic vibration of the mass is comparable to a condition of resonance wherein the relative velocity between the tool and the mass is sharply increased during the working stroke as a result of the vibration of the area of the mass adjacent to the tool and the reciprocation of the tool being substantially out of phase during said working stroke. However, while a condition of sympathetic vibration of the mass as above considered is compared theoretically with a condition of resonance thereof, it will be readily understood that a sympathetic vibration of the mass as above considered is compared theoretically with a condition of resonance thereof, it will be readily understood that a sympathetic vibration condition of the mass does not require resonance in the technical sense (i.e., with the vibration frequency of the mass matching the reciprocation frequency of the tool), and is not limited to such resonance in the technical sense, since sympathetic vibration may also occur in a mass where the frequency relationship between the tool and the work is harmonic or sub-harmonic in character. Similarly, it will be readily understood, as has been previously pointed out, that the frequency or frequencies at which a characteristic condition of sympathetic vibration will occur in a given mass when subjected to a reciprocating tool are determined by the nature and physical dimensions thereof, with the thickness, width, and length of the mass all being material to the latter consideration. Generally speaking, it has been observed in applicant's experience that the more dense the mass and the larger the physical dimensions of the mass the lower its first notable characteristic sympathetic vibration condition, considered in terms of the operational efficiency of the reciprocating work tool according to the present invention. Thus, generally speaking, a lighter metal sheet may be expected to have a somewhat higher characteristic sympathetic vibration frequency than a heavier metal sheet of the same physical dimentions, and a sheet of wood having the same physical dimensions will have an even higher sympathetic vibration frequency than either the lighter or heavier metal sheet, although the comparison of wood and metal is further complicated by the differences in physical properties between the two materials, such as resiliency at high frequency. Two sheets of the same metal, differing only in thickness, generally and correspondingly find the thinner with a higher sympathetic vibration frequency. While the physical dimensions of length and width of sheet material have also been found significant, but less so than the thickness dimension thereof, the sympathetic vibration frequency for a given sheet of given length and width dimensions is difficult to accurately predict because of the greater tendency toward generation of harmonic wavelengths along the width and length dimensions of the sheet.

Not withstanding the various considerations with respect to the theoretical aspects of what constitutes a "sympathetic vibration condition" in a mass being worked, operationally an appropriate operating condition is readily recognizable and, as a consequence, arrived at and maintained when a given work mass and given tool are presented by virtue of the increased efficiency and smoothness of tool action occasioned thereby, and the terms "sympathetic vibration condition" and "condition of sympathetic vibration" are to be construed as including all modes of operation producing such increased efficiency and smoothness in tool action.

The piston of my invention is freely, floatingly mounted for extremely high speed reciprocation. This reciprocation is typically characterized by and due to the novel rapid means for exhausting and inlet porting of the compressed fluid medium. The reciprocation of the piston directly causes the valving of the fluid pressure medium between port chambers or channels and passageways within the piston on the one hand and the cylinder on the other, all independent of any sliding or other separate valve means. Sliding valve means as a separate element mounted upon or operated by the piston is wholly absent therefrom. The driving force is applied through the fluid pressure medium acting upon the piston end faces, the only faces it has disposed at right angles to the axis of reciprocation and are remote from the longitudinal center. The piston valving operation does not depend upon any valving means for its operation which positively requires to be engaged during reciprocation by the piston in taking a given predetermined and mechanically fixed length of stroke or distance of travel. The length of stroke or distance of travel of the piston of my discovery and invention and the speed and the power thereof, as well as the type of vibration produced may be adjusted and controlled in creating the character of condition in the mass being worked upon by the work performing element—the construction of the engine mechanism being such as to permit of such control and regulation by the operator.

By way of showing greatly increased results, a device embodying my invention and operating according to the discovery of my invention and weighing many times less than a competitive tool designed to cut or perform the same operations, has been operated and performed the operation in a fraction of the time required by a competitive tool.

Also by way of showing greatly increased results, a device embodying my invention and operating according to my process has definitely proven that it has more power, far less weight, and employs far less fluid pressure than a standard competitive tool designed to do the same general operation.

Also, the manufacturing cost is far less and the maintenance is a plurality of times less than that of devices in common practice to do similar work.

The engine or motor herein set forth is applicable to use as a vibrator as well as the hammer type of mechanism.

From the above, particularly the demonstrations wherein it is manifest how the tool clings or holds itself into the work in connection with wood, and how the tool in cutting metal holds itself to smoothness of operation, it is evident that the tool, after the adjustment of the engine operation to a sympathetic vibration condition of the particular mass being worked, responds to its efficient operation and the smoothness of its operation from then on directs, as it were, the control condition for continuation of the operation.

From the foregoing it will be further apparent that the controlled generation of a sympathetic vibration condition in a particular mass being worked may be effected by selective operational variation of the distance between the reciprocatory piston or extension thereof and the tool shank, or may be selectively varied by operational regulation of the fluid medium input rate and pressure, or both, or by such other operational variation and regulation of the reciprocation rate, length of stroke, and power of the reciprocatory motive means as may evolve to permit selective and controlled generation of a sympathetic vibration condition characteristic of a mass being worked.

It will be readily understood that the methods of the present invention and discovery are applicable to any material in which a condition is developed which is characterized by increased efficiency of tool operation according to the present invention.

This application is a continuation-in-part of my copending application Ser. No. 301,314, entitled "Fluid Pressure Operated Reciprocatory Vibratory Sheet Material Cutting Shears," filed July 28, 1952, and issued as Patent No. 2,763,060 on September 18, 1956, and is also a continuation-in-part of my copending application Ser. No. 525,417, entitled "Process of Preparing Mass To Be Worked and High Speed Engine for Said Process," filed August 1, 1955, and now abandoned.

I claim:

1. The method of operation of a reciprocatory tool characterized by a high rate of reciprocation, comprising subjecting a work mass to a free floating reciprocating tool of a force and rate which develops a vibration of sympathetic magnitude; selecting a work mass with a given characteristic sympathetic vibration frequency; manipulatively matching the operation frequency of said tool with said characteristic sympathetic vibration frequency; and feeding said tool along said mass while maintaining said frequency of tool reciprocation and such sympathetic vibration in the mass.

2. The method of employing compressed fluid medium in performing work upon a solid mass of material by a work performing element comprising subjecting said mass to a series of strokes through means of said work performing element; reciprocatively striking said work performing element with an unfettered and freely floating reciprocating piston of a fluid pressure engine against said work performing element; manipulatively selectively adjusting the length of strokes of said piston until a condition of disturbance in the mass is generated which effectively facilitates the work being performed; and maintaining said condition of disturbance while the work performing operation is continued.

3. The method of employing compressed fluid medium in performing work upon a solid mass of material by a work performing element comprising subjecting said mass to a series of strokes through means of said work performing element; reciprocatively striking said work performing element with an unfettered and freely floating reciprocating piston of a fluid pressure engine against said work performing element; manipulatively selectively adjusting the length, speed, power and type of disturbance of said strokes until a condition of disturbance in the mass is generated which effectively facilitates the work being performed; and maintaining said condition of disturbance while the work performing operation is continued.

4. The method of employing fluid pressure medium in causing a work performing element to operate upon a solid mass to be worked comprising the steps of subjecting said solid mass through means of said work performing element to a series of strokes of adjustable length delivered by a valveless reciprocating piston, said reciprocations being at a rate of not less than 14,500 per minute; manipulatively selectively adjusting the length of said strokes by varying the closeness with which the driving element of the engine is held to the end of the work performing element until the spacing therebetween is reached where a condition of vibration is generated effectively facilitating the entry and progress of said work performing element in said solid mass; and maintaining said work performing element in contact with said solid mass while imparting said strokes.

5. The method of employing fluid pressure medium in causing a work performing element to operate upon a solid mass to be worked comprising the steps of subjecting said solid mass through means of said work performing element to a series of strokes of adjustable length, speed, power and type of vibration delivered by a valveless reciprocating piston, said reciprocations being at a rate of not less than 14,500 per minute; manipulatively selectively adjusting the length of said strokes by varying the closeness with which the driving element of the engine is held to the end of the work performing element until the spacing therebetween is reached where a condition of vibration is generated effectively facilitating the entry and progress of said work performing element in said solid mass; and maintaining said work performing element in contact with said solid mass while imparting said strokes.

6. The method of employing a pressure medium in causing a work performing element to operate upon a solid mass to be worked, comprising the step of subjecting said solid mass through means of said work performing element through a series of strokes of adjustable length from a fluid pressure operated unfettered and free floating reciprocating driving element of the fluid pressure engine capable of developing reciprocation of said driving element at a rate and power of stroke to create effective vibration in said solid mass; manipulatively adjusting the reciprocations of said driving element by varying the closeness with which the driving element of the engine is held to the end of the work performing element until a space therebetween is reached where a condition of vibration in said solid mass is created which is characteristic of said mass which condition effectively facilitates the entry of said work performing element into said mass; and maintaining said work performing element in contact with said solid mass while imparting said strokes.

7. The method of causing a work performing element to perform work upon a solid mass, comprising the steps of subjecting said mass through means of said work performing element to a series of strokes, adjustable as to length and power impulses from a fluid pressure operated unfettered and free floating reciprocating driving element of a fluid pressure engine capable of developing reciprocation of said driving element at a rate and power of stroke to create effective vibrations in said solid mass; manipulatively adjusting the stroke frequency and power of said driving element of the engine by varying the closeness with which the driving element of the engine is held to the end of the work performing element until a space therebetween is reached where a condition of regular cyclic vibration frequency in the solid mass is generated which is so correlated to the reciprocations of the said driving element that the entry of the work performing element into the mass is effectively facilitated; and maintaining said work performing element in contact with said solid mass while imparting said strokes.

8. The method of operation of a reciprocatory tool characterized by a high rate of reciprocation, comprising subjecting a work mass to the action of a tool subject to unfettered and free floating reciprocation, manipulatively selecting a reciprocation frequency for said tool which generates a characteristic condition of sympathetic vibration in the mass being worked; and feeding the tool along said mass while maintaining said rate of tool reciprocation and such condition of sympathetic vibration in the mass.

9. A method according to claim 8 wherein the vibration of the mass and the free floating generated reciprocation of the tool is manipulatively controlled whereby the sympathetic vibration condition is generated in the mass being worked with the relative velocity between the tool and the mass being markedly increased during the working stroke and substantially out of phase.

10. A method according to claim 8 further comprising manipulatively maintaining a harmonic relation between the vibration frequency of the mass and the reciprocation frequency of the tool.

11. A method according to claim 8 further comprising operationally controlling the rate of reciprocation of the tool by adjusting the closeness of the shank of the tool with respect to the unfettered and free floating reciprocating element driving the tool and simultaneously manipulatively adjusting the fluid medium input rate and pressure as delivered to the free floating reciprocatory piston fluid pressure actuating engine driving said tool, both said operational adjustments cooperating to provide a resulting reciprocation frequency of the tool generating said sympathetic vibration condition in said mass.

12. The method of employing fluid pressure medium in causing a work performing element to operate upon a solid mass to be worked, comprising the steps of subjecting said solid mass to a series of impulses of adjustable power received from a fluid pressure operated unfettered and free floating reciprocating driving element; manipulatively adjusting the frequency and length of stroke of said reciprocations until the resistance of said solid mass to the entry of said work performing element is reduced and maintaining said work performing element in contact with said solid mass.

13. In a high speed fluid pressure engine the combination comprising a cylinder; cylinder exhaust passageways leading from the bore of said cylinder to the atmosphere; a piston of cylindrical form unfettered and free floating reciprocatively mounted in said cylinder; an exhausting passageway leading from the end face of said piston to that portion of the cylinder engaging face of the piston which is adjacent the said end of the piston; and a circumferential exhausting channel disposed in said portion of the cylinder engaging face of the piston which is adjacent said end of the piston and is communicatively connected to said exhausting passageway, whereby fluid pressure from the end of said cylinder is quickly and suddenly exhausted.

14. The method of employing fluid pressure medium in causing a work performing element of a fluid pressure engine to operate upon a solid mass to be worked comprising the steps of subjecting said solid mass through means of said work performing element of said engine to a series of strokes of adjustable length from a fluid pressure operated reciprocating driving element reciprocating at a rate of not less than 14,500 per minute; manipulatively adjusting the length of said strokes by varying the closeness with which the driving element of the engine is held to the end of the work performing element until a space therebetween is reached where a condition of disturbance in said solid mass is created which effectively facilitates the entry of said work performing element into said solid mass; and maintaining said work performing element in contact with said solid mass while imparting said strokes.

15. The method of employing fluid pressure medium in causing a work performing element of a fluid pressure engine to operate upon a solid mass to be worked comprising the steps of subjecting said solid mass through means of said work performing element of said engine to a series of strokes of adjustable length from a fluid pressure operated reciprocating driving element reciprocating at the rate of not less than 14,500 per minute; manipulatively adjusting the length, speed, power of stroke and type of vibration generated by the engine by varying the closeness with which the driving element of the engine is held to the end of the work performing element until a space therebetween is reached where a condition of disturbance in said solid mass is created which effectively facilitates the entry of said work performing element into said solid mass; and maintaining said work performing element in contact with said solid mass while imparting said strokes.

16. A high speed compressed air engine comprising a cylinder, a pair of exhaust ports spaced longitudinally thereof and an air admission port midway between the same, a piston in the cylinder, the piston having two wide air channels therearound and equidistantly spaced from and on opposite sides of the transverse center of the piston, the piston having two limit positions in the cylinder and the inlet port being alternately in communication with the channels in the reciprocation of the piston from one to the other of said positions, means for conducting air from the channel with which the inlet port is connected in each limit position of the piston to and through the remote end of the piston into the cylinder for effecting movement of the piston away from the end of the cylinder into which the air is delivered, a narrow circumferential channel in and around the piston between one of the air channels and the adjacent end of the piston, said narrow channel being in communication with an exhaust port when the piston is at the limit of its movement toward the end of the cylinder adjacent the last mentioned exhaust port, the piston when in the last stated limit position having the air channel remote from said narrow channel in communication with the other exhaust port.

17. The invention according to claim 16, wherein the piston at the end remote from the narrow channel has a circular wall portion between such end and the adjacent air channel adapted to close the said other exhaust port when the piston is at one limit position in the cylinder.

18. A compressed fluid actuated engine comprising a cylinder having a front and rear end portion; a fluid admission port opening thereinto; a pair of fluid exhaust ports leading therefrom on opposite sides of a transverse plane through the admission port; a piston in said cylinder having a front and rear end portion which portions operate respectively in said front and rear end portions of said cylinder, said piston having front and rear relatively wide circumferential channels, said front and rear channels being located in the corresponding front and rear end portions of the piston, said channels being spaced apart on opposite sides of the transverse center of the piston, said channels being alternately in communication with said admission port in the reciprocation of the piston, and said exhaust ports being alternately in communication with that channel nearest thereto when the other channel is in communication with the admission port; a front narrow channel adjacent said front end of the piston; a rear narrow channel adjacent the rear end of the piston; a front fluid longitudinally extending passageway in the piston extending from and in communication with said rear wide channel to and through the face of the front end of the piston, said passageway having an opening extending into the front circumferential narrow channel; a rear fluid longitudinally extending passageway in the piston extending from said front wide channel to and through the face of the rear end of the piston, said passageway having an opening extending into the rear narrow channel.

19. A compressed fluid actuated engine comprising a cylinder having a front and rear end portion; a fluid admission port opening thereinto; a pair of fluid exhaust ports leading therefrom on opposite sides of a transverse plane through the admission port; a piston in said cylinder having a front and rear end portion which portions operate respectively in said front and rear end portions of said cylinder, said piston having front and rear relatively wide circumferential channels, said front and rear channels being located in the corresponding front and rear end portions of the piston, said channels being spaced apart on opposite sides of the transverse center of the piston, said channels being alternately in communication with said admission port in the reciprocation of the piston, and said exhaust ports being alternately in communication with that channel nearest thereto when the other channel is in communication with the admission port; a very narrow and shallow circumferential starting groove located between said wide channels registrable with the admission port in the event the piston stops on dead center; a front narrow channel adjacent said front end of the piston; a rear narrow channel adjacent the rear end of the piston; a front fluid longitudinally extending passageway in the piston extending from and in communication with said rear wide channel to and through the face of the front end of the piston, said passageway having an opening extending into the front circumferential narrow channel; a rear fluid longitudinally extending passageway in the piston extending from said front wide channel to and through the face of the rear end of the piston, said passageway having an opening extending into the rear narrow channel; and a passageway extending from said starting groove to one of said longitudinally extending passageways.

20. A compressed fluid actuated engine comprising a cylinder having a front and rear end portion; a fluid admission port opening thereinto; a pair of fluid exhaust ports leading therefrom on opposite sides of a transverse plane through the admission port; a piston in said cylinder having a front and rear end portion which portions operate respectively in said front and rear end portions of said cylinder, said piston having front and rear relatively wide circumferential channels, said front and rear channels being located in the corresponding front and rear end portions of the piston, said channels being spaced apart on opposite sides of the transverse center of the piston, said channels being alternately in communication with said admission port in the reciprocation of the piston, and said exhaust ports being alternately in communication with that channel nearest thereto when the other channel is in communication with the admission port; a front narrow channel adjacent said front end of the piston; a rear narrow channel adjacent the rear end of the piston; a front fluid longitudinally extending passageway in the piston extending from and in communication with said rear wide channel to and through the face of the front end of the piston, said passageway having an opening extending into the front circumferential narrow channel; a rear fluid longitudinally extending passageway in the piston extending from said front wide channel to and through the face of the rear end of the piston, said passageway having an opening extending into the rear narrow channel; and a quick escape fluid exhaust passageway extending from one of said narrow channels to the adjacent end of the piston.

21. A compressed fluid actuated engine comprising a cylinder having a front and rear end portion; a fluid admission port opening thereinto; a pair of fluid exhaust ports leading therefrom on opposite sides of a transverse plane through the admission port; a piston in said cylinder having a front and rear end portion which portions operate respectively in said front and rear end portions of said cylinder, said piston having front and rear relatively wide circumferential channels, said front and rear channels being located in the corresponding front and rear end portions of the piston, said channels being spaced apart on opposite sides of the transverse center of the piston, said channels being alternately in communication with said admission port in the reciprocation of the piston, and said exhaust ports being alternately in communication with that channel nearest thereto when the other channel is in communication with the admission port; a very narrow and shallow circumferential starting groove located between said wide channels registrable with the admission port in the event the piston stops on dead center; a front narrow channel adjacent said front end of the piston; a rear narrow channel adjacent the rear end of the piston; a front fluid longitudinally extending passageway in the piston extending from and in communication with said rear wide channel to and through the face of the front end of the piston, said passageway having an opening extending into the front circumferential narrow channel; a rear fluid longitudinally extending passageway in the piston extending from said front wide channel to and through the face of the rear end of the piston, said passageway having an opening extending into the rear narrow channel; a passageway extending from said starting groove to one of said longitudinally extending passageways; and a quick escape fluid exhaust passageway extending from each of said narrow channels to the adjacent end of the piston.

22. A compressed fluid actuated engine comprising a cylinder having a front and rear end portion; a fluid admission port opening thereinto; a pair of fluid exhaust ports leading therefrom on opposite sides of a transverse plane through the admission port; a piston in said cylinder having a front and rear end portion which portions operate respectively in said front and rear end portions of said cylinder, said piston having front and rear relatively wide circumferential channels, said front and rear channels being located in the corresponding front and rear end portions of the piston, said channels being spaced apart on opposite sides of the transverse center of the piston, said channels being alternately in communication with said admission port in the reciprocation of the piston and said exhaust ports being alternately in communication with that channel nearest thereto when the other channel is in communication with the admission port; a circumferential channel disposed at one end of the piston; a front fluid longitudinally extending passageway in the piston extending from and in communication with said rear wide channel to and through the face of the front end of the piston; a rear fluid longitudinally extending passageway in the piston extending from said front wide channel to and through the face of the rear end of the piston; a passageway extending from said narrow circumferential channel to that longitudinal passageway extending therebeneath; and a circular wall portion disposed on the end portion of the piston opposite to the end of the piston on which said narrow circumferential channel is disposed.

23. A device of the character described comprising a cylinder having a front and rear end portion; a fluid admission port opening thereinto; a fluid exhaust port leading from said cylinder on each side of a plane coinciding with the axis of said inlet port and said plane extending transversely of said cylinder; a piston in said cylinder having a front and rear end portion which portions operate respectively in said front and rear end portions of said cylinder, said piston having front and rear circumferential channels, said front and rear channels being located in the corresponding front and rear end portions of the piston respectively, said channels being alternately in communication with said admission port in the reciprocation of the piston and said exhaust port being alternately in communication with that channel nearest thereto when the other channel is in communication with the admission port; a circumferential channel disposed at one end of the piston; a front fluid longitudinally extending passageway in the piston extending from and in communication with said rear wide channel to and through the face of the front end of the piston; a rear fluid longitudinally extending passageway in the piston extending from said front wide channel to and through the face of the rear end of the piston; and a passageway extending from said narrow circumferential channel to that longitudinal passageway extending therebeneath.

24. A device of the character described comprising a cylinder having a front and rear end portion; a fluid inlet admission port opening thereinto; a fluid exhaust port leading from said cylinder on each side of a plane coinciding with the axis of said inlet port and said plane extending transversely of said cylinder; a piston in said cylinder having a front and rear end portion which portions operate respectively in said front and rear end portions of said cylinder, said piston having front and rear circumferential channels, said front and rear channels being located in the corresponding front and rear end portions of the piston respectively, said channels being alternately in communication with said admission port in the reciprocation of the piston and said exhaust port being alternately in communication with that channel nearest thereto when the other channel is in communication with the admission port; a very narrow and shallow circumferential starting groove located between said wide channels registrable with the admission port in the event the piston stops on dead center; a circumferential channel disposed at one end of the piston; a front fluid longitudinally extending passageway in the piston extending from and in communication with said rear wide channel to and through the face of the front end of the piston; a rear fluid longitudinally extending passageway in the piston extending from said front wide channel to and through the face of the rear end of the piston; a passageway extending from said narrow circumferential channel to that longitudinal passageway extending therebeneath; and a passageway extending from said starting groove to one of said longitudinally extending passageways.

25. A compressed fluid actuated engine comprising a cylinder having a front and rear end portion; a fluid inlet admission port opening thereinto; a fluid exhaust port leading from said cylinder on each side of a plane coinciding with the axis of said inlet port, said plane extending transversely of said cylinder; a piston in said cylinder having a front and rear end portion which portions operate respectively in said front and rear end portions of said cylinder, said piston having front and rear relatively wide circumferential channels, said front and rear channels being located in the corresponding front and rear end portions of the piston, said channels being alternately in communication with that channel nearest thereto when the other channel is in communication with the admission port; a circumferential channel disposed at one end of the piston; a front fluid longitudinally extending passageway in the piston extending from and in communication with said rear wide channel to and through the face of the front end of the piston; a rear fluid longitudinally extending passageway in the piston extending from said front wide channel to and through the face of the rear end of the piston; and a passageway extending from said narrow circumferential channel to that longitudinal passageway extending therebeneath, the bore of said cylinder being of a length equal to the length of the piston plus the distance between the inner walls of the said circumferential wide channels plus the diameter of the admission port.

26. A high speed fluid pressure engine comprising a cylinder having an inlet admission port intermediate its length; cylinder exhaust passageways on each side of said admission port; a piston of cylindrical form freely reciprocatingly mounted in said cylinder which piston has ports disposed in the piston on each side of the medial portion, each port having a passageway communicatingly connecting with the remote end face of the piston; said piston also having short passages leading from the end face of the piston to openings in the cylindrical face portion of the piston adjacent the said end; a circumferential quick exhausting channel communicatively connected with the openings of the short passages in the face in providing means for quick and sudden exhausting of the fluid pressure after the use thereof by the piston is completed.

27. In a high speed fluid pressure engine, the combination comprising a cylinder; a piston of cylindrical form unfettered and free floating reciprocally mounted in said cylinder which piston is characterized by having a short exhausting passageway leading from the end engaging face of said piston to that portion of the cylinder face of the piston which is adjacent the said end of the piston and a circumferential exhausting channel disposed in said portion of the cylinder engaging face of the piston which is adjacent said end of the piston.

28. In a high speed fluid pressure engine, the combination comprising a cylinder; cylinder exhaust passageways, a piston freely reciprocating mounted in said cylinder, which piston has longitudinal passageways starting intermediate the length of the piston and extending through the end faces of the pistons, said pistons having a lug on its cylinder contacting face on each end having a circumferentially disposed exhausting channel in at least one of said lugs which channel has an exhausting port communicatingly connected with a short passageway extending from the end face of the piston to said exhausting channel; and a separate passageway communicatively connecting said exhausting channel with one of said longitudinal piston passageways in providing for sudden and quick dropping of the pressure in the end of the cylinder into which the piston is about to move.

29. A high speed fluid pressure engine comprising a cylinder having an inlet admission port intermediate its length; cylinder exhaust passageways on each side of said admission port; a piston freely reciprocatingly mounted in said cylinder which piston has a lug intermediate the ends of the piston, said lug consisting of two lands and circumferential starting groove with a starting orifice therein, said central lug having a width which just covers the width of the inlet admission port, said piston also having a lug on each end, one of said end lugs having a circumferentially disposed quick exhausting channel and between said end lugs and said lug having the starting groove relatively wide channels, each of which has a horizontal passageway communicatingly extending from each of said wide channels to and through that end face of the piston most remote from said wide channel respectively, said exhausting channels having an exhausting port communicatingly connected with a short passageway extending through the adjacent face of the piston, and a separate passageway communicatively connecting said exhausting channel with that horizontal passageway which extends to the wide channel most remote from said exhausting channel, said starting groove orifice having a passageway communicatingly connecting through one of the ends of said piston, said admission port registering with one of said wide channels while the other wide channel is registering with one of said cylinder exhaust passageways.

30. In a high speed fluid pressure engine, the combination comprising a cylinder; exhausting passageways through said cylinder; a circumferential exhausting channel in the bore face portion of said cylinder disposed in the intersection formed by passing a transverse plane normally through the cylinder bore opening of said exhaust passageway; a piston of cylindrical form unfettered and free floating reciprocally mounted in said cylinder; and a passageway leading from the end face of said piston to that portion of the cylindrical face of the piston adjacent the said end of the piston.

References Cited in the file of this patent

UNITED STATES PATENTS

| | | |
|---|---|---|
| 542,498 | Rinsche | July 9, 1895 |
| 1,940,388 | Callahan | Dec. 19, 1933 |
| 2,369,779 | Forss | Feb. 20, 1945 |
| 2,722,918 | Kimball | Nov. 8, 1955 |

FOREIGN PATENTS

| | | |
|---|---|---|
| 487,154 | Great Britain | June 13, 1938 |
| 605,680 | Great Britain | July 28, 1948 |

UNITED STATES PATENT OFFICE
Certificate of Correction

Patent No. 2,911,951                                          November 10, 1959

Bernard A. Swanson

It is hereby certified that error appears in the above numbered patent requiring correction and that the said Letters Patent should read as corrected below.

In the drawings, Sheet 5, containing Figures 20, 21, and 22, and Sheet 6, containing Figure 23, as shown below should be inserted as part of the Letters Patent:

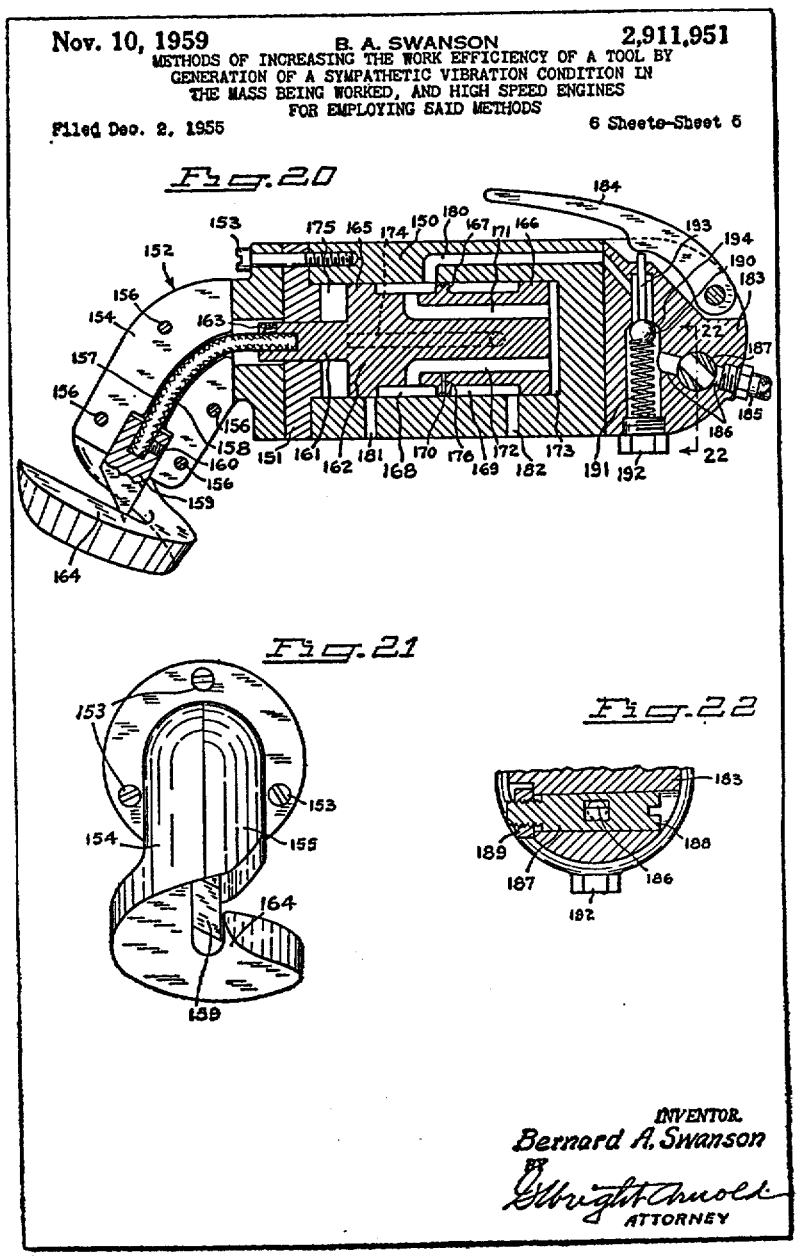

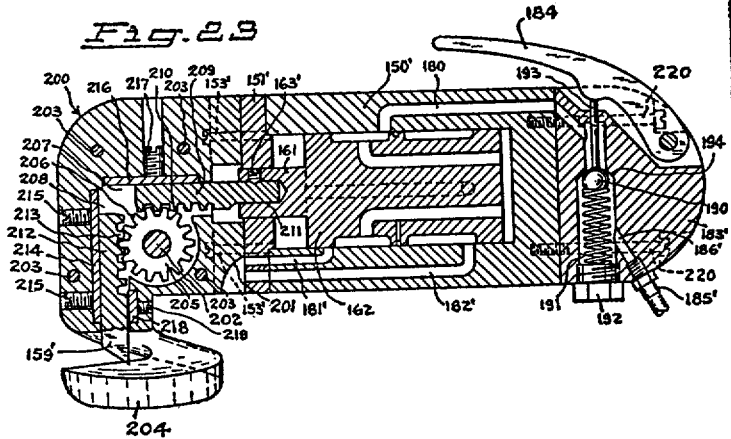

in the heading to the drawings, Sheets 1, 2, 3, and 4, for "4 Sheets", each occurrence, read —6 Sheets—.

Signed and sealed this 16th day of August 1960.

[SEAL]

Attest:
KARL H. AXLINE,
*Attesting Officer.*

ROBERT C. WATSON,
*Commissioner of Patents.*